United States Patent [19]

Ohuchi

[11] Patent Number: 5,257,610
[45] Date of Patent: Nov. 2, 1993

[54] TROUBLESHOOTING SYSTEM FOR EXHAUST GAS RECIRCULATION CONTROLLER

[75] Inventor: Hirofumi Ohuchi, Hyogo, Japan
[73] Assignee: Mitsubishi Denki K.K., Tokyo, Japan
[21] Appl. No.: 897,356
[22] Filed: Jun. 11, 1992

[30] Foreign Application Priority Data

| | | | |
|---|---|---|---|
| Jun. 14, 1991 | [JP] | Japan | 3-143241 |
| Jun. 14, 1991 | [JP] | Japan | 3-143242 |
| Jun. 14, 1991 | [JP] | Japan | 3-143243 |
| Jun. 14, 1991 | [JP] | Japan | 3-143245 |
| Jun. 21, 1991 | [JP] | Japan | 3-150163 |

[51] Int. Cl.$^5$ .................................................. F02M 25/06
[52] U.S. Cl. ............................. 123/571; 364/431.06
[58] Field of Search ............................ 123/568, 571; 364/431.06

[56] References Cited

U.S. PATENT DOCUMENTS

| | | | |
|---|---|---|---|
| 4,870,941 | 10/1989 | Hisatomi | 123/571 |
| 4,870,942 | 10/1989 | Shibata et al. | 123/571 |
| 4,879,986 | 11/1989 | Sakamoto | 123/571 |
| 5,014,203 | 5/1991 | Miyazaki et al. | 123/571 |
| 5,150,695 | 9/1992 | Kondo | 123/571 |
| 5,154,156 | 10/1992 | Ohuchi | 123/571 |

FOREIGN PATENT DOCUMENTS

| | | | |
|---|---|---|---|
| 62-51746 | 3/1987 | Japan . | |
| 0051747 | 3/1987 | Japan | 123/571 |
| 0243446 | 10/1988 | Japan | 123/571 |
| 0259150 | 10/1988 | Japan | 123/571 |

*Primary Examiner*—Tony M. Argenbright
*Assistant Examiner*—M. Macy
*Attorney, Agent, or Firm*—Sughrue, Mion, Zinn, Macpeak & Seas

[57] ABSTRACT

A troubleshooting system for an exhaust gas recirculation (EGR) controller, which troubleshoots the EGR controller in an optimal short EGR-OFF time by not only detecting either a rate of change of an intake manifold pressure or a difference between a maximum and a minimum thereof associated with the turning on and of the EGR in accordance with an EGR flow amount using an operation condition detecting means, but also detecting a number of revolutions of an engine or the like.

12 Claims, 21 Drawing Sheets

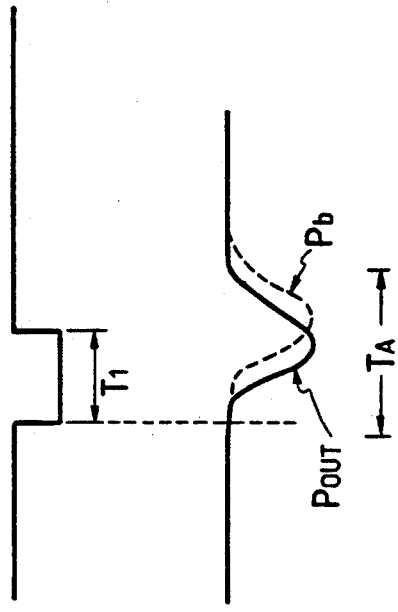
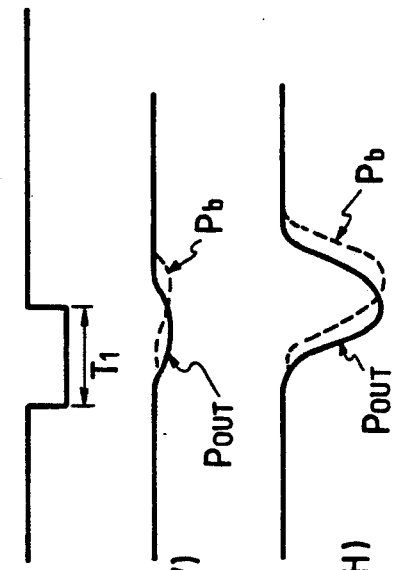
FIG. 10(a)
FIG. 10(b)
FIG. 11(a)
FIG. 11(b)
FIG. 11(c)

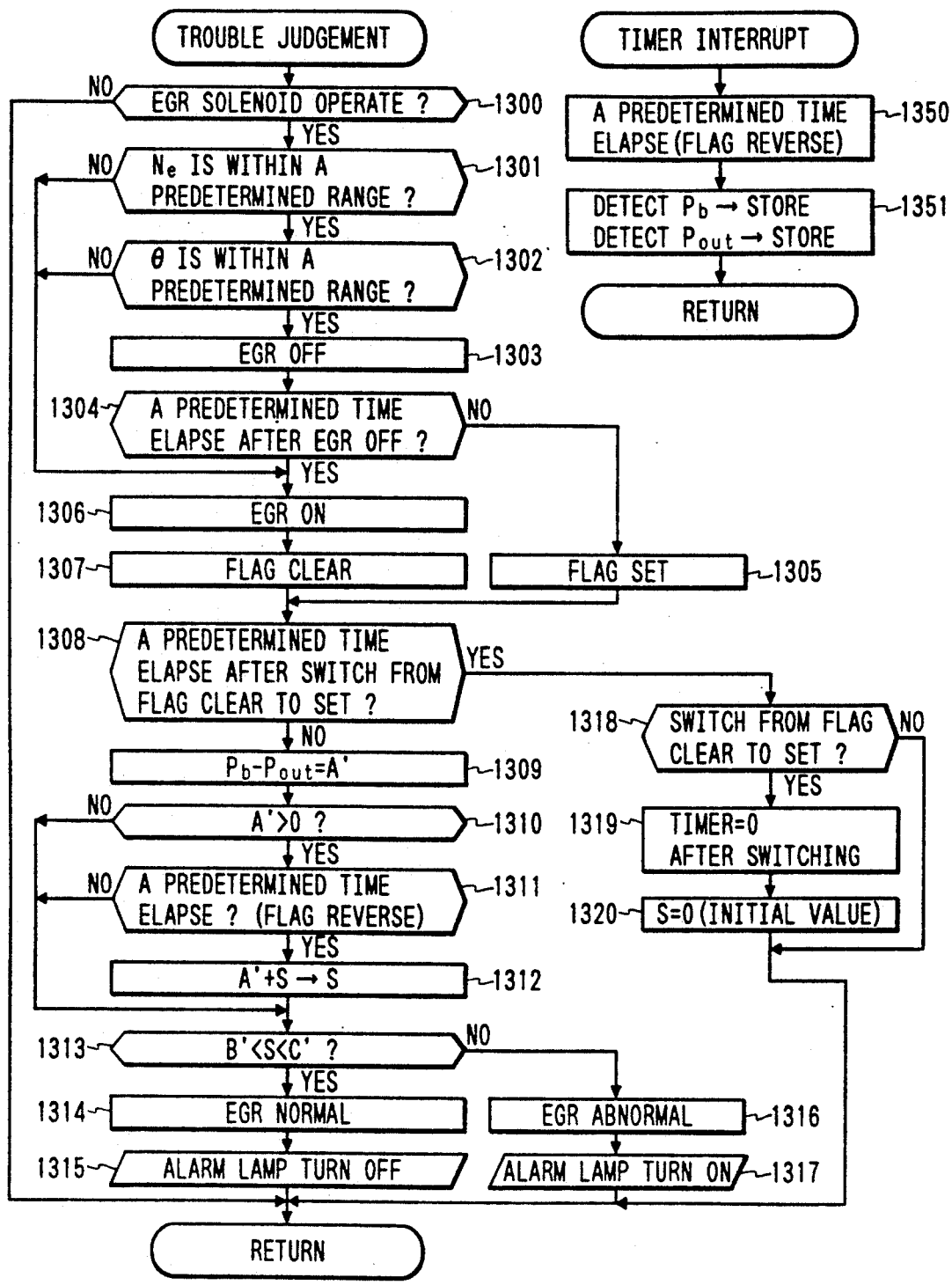

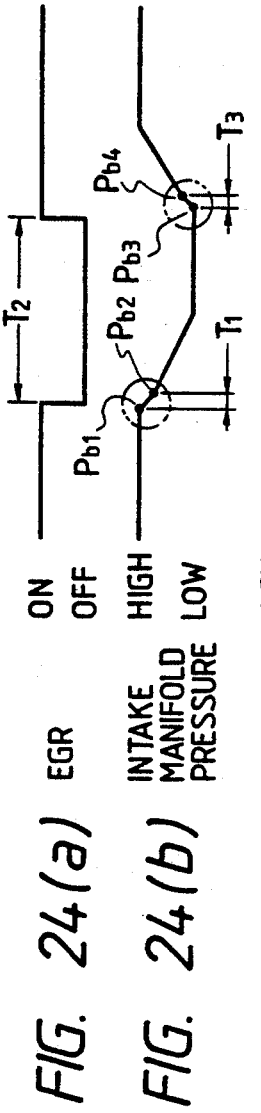
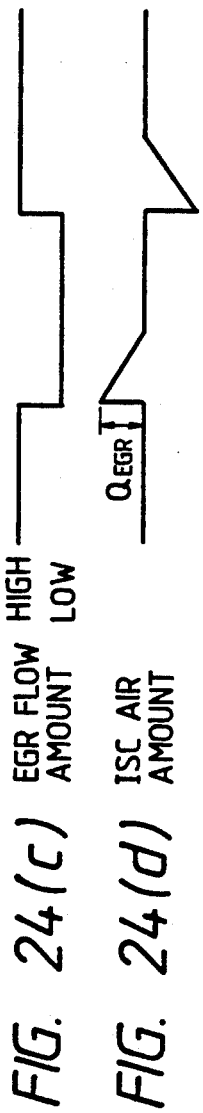
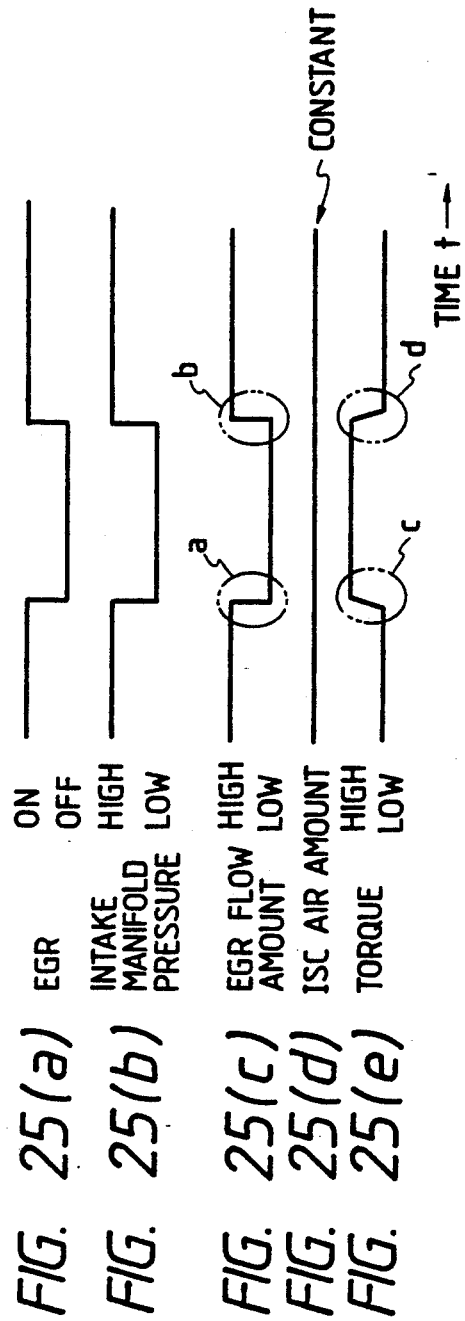

TROUBLESHOOTING SYSTEM FOR EXHAUST GAS RECIRCULATION CONTROLLER

BACKGROUND OF THE INVENTION

The invention relates to an exhaust gas recirculation controller that recirculates a part of exhaust gas in a combustion engine into an intake pipe of the combustion engine. More particularly, it is directed to a troubleshooting system for the exhaust gas recirculation controller.

An exhaust gas recirculation (EGR) controller (hereinafter referred to as "EGR controller") has heretofore been in wide use as a means for reducing NOx (nitrogen oxide) contained in exhaust gas within a combustion engine. The EGR controller controls EGR by a back pressure control system employing a back pressure transducer (BPT) valve. That is, the passage area of an EGR control valve (hereinafter referred to as "EGR valve") is controlled by the BPT valve so that the EGR flow amount can be maintained at a predetermined value. Even in a system using a venturi vacuum transducer (VVT) valve as well as in a system for controlling the control pressure of the EGR valve using a solenoid valve, the area of passage of the EGR valve is similarly controlled as in the system using the BPT valve.

By the way, a system for troubleshooting such an EGR controller has been proposed in Japanese Patent Unexamined Publication No. 51746/1987. The system is designed to detect the pressure of air sucked into an intake manifold when there exists an EGR flow amount (when EGR is turned on), i.e., an intake manifold pressure value $P_{ON}$ (see FIG. 4), and an intake manifold pressure value $P_{OFF}$ when there exists no EGR flow amount (when the EGR is turned off) (see FIG. 4). And the system issues an alarm when the difference between these pressures is out of a predetermined range.

However, thus constructed conventional EGR controller that controls the EGR flow amount by varying the passage area of the EGR valve has addressed the following problems.

(1) Since a stable intake manifold pressure after the EGR has been turned on or off must be measured (by "stable," it is intended to mean that a change has been complete with all transients and fluctuations settled down), a relatively long time $T_B$ (see FIG. 4) during which the operation is stable must be provided. This has been responsible for relatively small troubleshooting chance.

(2) Since a stable intake manifold pressure after the EGR has been turned off must be measured, a relatively long period $T_2$ (see FIG. 4) during which the EGR is turned off must be provided. This has imposed a driveability problem that an operator is subjected to mechanical shock. Further, the long EGR-off time deteriorates exhaust gas conditions.

(3) In a region where the amount of air sucked is small, the EGR flow amount is naturally small. Thus, the difference in intake manifold pressure between the turning on and off of the EGR becomes small, thereby making the troubleshooting difficult. Further, when the amount of air sucked is large (or the intake manifold pressure (absolute pressure) is high, or the back pressure (absolute pressure) is high), the difference in EGR flow amount between the turning on and off of the EGR becomes large, but the difference in intake manifold pressure becomes small while affected by the pressure loss in the recirculation pipe due to the large EGR flow amount. Thus, the troubleshooting is also difficult.

(4) Since the EGR flow amount changes abruptly as the EGR turns on or off (see parts a, b in FIG. 25 (c)), the fixing of the amount of air to be supplied to the internal combustion engine (ISC air amount) (see FIG. 25 (d)) at a constant value causes firing conditions to be changed between the turning on and off of the EGR, which then causes variations in torque (see parts c, d in FIG. 25 (e)). Particularly, since the variations in torque at the time the EGR turns on and off are larger in a region with a large EGR flow amount, there is the driveability problem that the operator is subjected to mechanical shock.

SUMMARY OF THE INVENTION

The invention has been made to overcome the above problems. Accordingly, an object of the invention is to provide a troubleshooting system for an exhaust gas recirculation (EGR) controller which is capable not only of increasing chances for detecting abnormality of the EGR controller when the EGR turns on and off to thereby improve troubleshooting accuracy, but also of preventing the deterioration of exhaust gas conditions to thereby improve driveability.

To achieve the above object, a first aspect of the invention is applied to a troubleshooting system that includes: a recirculation pipe that recirculates exhaust gas within an internal combustion engine to an intake pipe; a recirculation valve that controls the flow amount of the exhaust gas flowing through the recirculation pipe; a recirculation valve passage area control means that controls the passage area of the recirculation valve; an operation condition detecting means that detects the operation condition of the internal combustion engine; a means for storing detected values from the operation condition detecting means that detects a wide area condition and a narrow or zero area condition set by the recirculation valve passage area control means; and a judging means for making a judgment based on the detected values.

As another mode of embodiment with respect to the above-mentioned troubleshooting system, the operation condition detecting means includes an operation condition detecting means that outputs every predetermined time a detected value of the recirculation valve being switched temporarily from the wide area condition to the narrow or zero area condition. Further, the judging means includes a means for calculating either a rate of change of the detected value or a difference between the maximum and the minimum thereof. As a result, a judgment can be made by comparing the calculated value with a value preset in accordance with the operation condition. For example, the detected value may be the intake pipe pressure.

The above-mentioned mode of embodiment designed to troubleshoot the EGR controller based on the turning on and off of the EGR is characterized as utilizing a change in the rate of change of the intake manifold pressure or a change in the difference between the maximum and the minimum thereof. Such changes are associated with the turning on and off of the EGR and take place in accordance with the EGR flow amount when the EGR-off time is maintained constant as shown in FIG. 6.

A second aspect of the invention is applied to a troubleshooting system, in which the operation condition detecting means includes a means for detecting pressures at arbitrary two points in the recirculation pipe when the passage area of the recirculation valve is temporarily switched from the wide area condition to the narrow or zero area condition only for a predetermined time by the recirculation valve passage area control means. The arbitrary two points are located from an outlet of the recirculation valve to the intake pipe or from an inlet of the recirculation valve to the exhaust pipe. Further, in such a troubleshooting system the judging means includes a means for calculating either an increment in pressure between the arbitrary two points or a difference in the time during which the pressures at the arbitrary two points come to coincide with each other, and judges whether or not the increment in pressure between the arbitrary two points is within a predetermined range or whether or not the difference in the time during which the respective pressures at the arbitrary two points come to coincide with each other is within a predetermined range.

The second embodiment of the invention designed to troubleshoot the EGR controller based on the turning on and off of the EGR is characterized as utilizing a change in pressure increment S or a change in time delay $T_{del}$ between the pressures at the two points in the recirculation pipe. Such changes take place in accordance with the EGR flow amount when the EGR-off time is maintained constant as shown in FIGS. 12 and 13.

A third aspect of the invention is applied to a troubleshooting system, in which the operation condition detecting means includes not only an operation condition detecting means for outputting a detected value of a first condition in which the passage area of the recirculation valve is set to a wide area by the recirculation valve passage area control means, but also an operation condition detecting means for outputting a detected value of a second condition in which the passage area of the recirculation valve is set to a narrow or zero area by the recirculation valve passage area control means. Further in such a troubleshooting system, a holding time of the second condition in which the recirculation valve passage area is set to the narrow or zero area is varied in accordance with the value detected by the operation condition detecting means.

The third embodiment of the invention designed to troubleshoot the EGR controller based on the turning on and off of the EGR is characterized as switching the EGR-off time in accordance with the load. Accordingly, the EGR-off time can be relatively shortened.

A fourth aspect of the invention is applied to a troubleshooting system, in which the operation condition detecting means includes not only an operation condition detecting means for outputting a detected value of a first condition in which the passage area of the recirculation valve is set to a wide area by the recirculation valve passage area control means, but also an operation condition detecting means for outputting a detected value of a second condition in which the passage area of the recirculation valve is set to a narrow or zero area by the recirculation valve passage area control means. In such a troubleshooting system the judging means makes a fault judgment in a predetermined region excluding a high-load region and a low-load region. The high-load region is a region in which the value detected by the operation condition detecting means has a large loss in the recirculation valve, and the low-load region is a region in which the EGR flow amount in the recirculation pipe is small.

Further, the judging means can make a fault judgment in a region in which the EGR flow amount in the recirculation pipe is equal to or smaller than a predetermined value.

The fourth embodiment of the invention designed to troubleshoot the EGR controller based on the turning on and off of the EGR is characterized as limiting the fault judgment region in accordance with the load. Accordingly, a fault can be detected in a region in which the EGR is turned on and in which a detected value such as the difference in intake manifold pressure between the turning on and off of the EGR is large.

Further, a fault can be detected only when the EGR flow amount is equal to or smaller than a predetermined value, thereby contributing to reducing variations in torque when the EGR turns on and off.

A fifth aspect of the invention is applied to a troubleshooting system, in which the operation condition detecting means includes not only an operation condition detecting means for outputting a detected value of a first condition in which the passage area of the recirculation valve is set to a wide area by the recirculation valve passage area control means, but also an operation condition detecting means for outputting a detected value of a second condition in which the passage area of the recirculation valve is set to a narrow or zero area by the recirculation valve passage area control means. Such a troubleshooting system further includes a means for controlling the number of revolutions of the internal combustion engine by adjusting the amount of air to be supplied to the internal combustion engine. Such revolution adjusting means is designed to supply a predetermined amount of air to the internal combustion engine in accordance with values detected by the operation condition detecting means when the first condition in which the passage area of the recirculation valve is set to the wide area is switched to the second condition in which the passage area of the recirculation valve is set to the narrow or zero area and when the second condition in which the passage area of the recirculation valve is set to the narrow or zero area is switched to the first condition in which the passage area of the recirculation valve is set to the wide area.

The fifth embodiment of the invention designed to troubleshoot the EGR controller based on the turning on and off of the EGR is characterized as supplying a predetermined amount of air to the internal combustion engine in accordance with a change in the value detected by the operation condition detecting means, such change being associated with the turning on and off of the EGR. Accordingly, variations in torque due to such abrupt change in the EGR flow amount can be suppressed.

BRIEF DESCRIPTION OF THE DRAWINGS

FIGS. 10a and 10b are diagrams showing changes in pressure at respective points as EGR turns on and off in the second embodiment;

FIGS. 11a-c are diagrams showing changes in pressure in accordance with the EGR flow amount as the EGR turns on and off in the second embodiment;

FIGS. 14a and 14b are flowcharts showing exemplary EGR controller troubleshooting processing in the second embodiment;

FIGS. 24a-e are diagrams illustrative of a relationship between a change in intake manifold pressure and a torque as the EGR turns on and off in the fifth embodiment;

FIGS. 25a-e are diagrams illustrative of a relationship between a change in intake manifold pressure and the torque as EGR turns on and off in a conventional example;

DETAILED DESCRIPTION OF THE PREFERRED EMBODIMENTS

A first embodiment of the invention will now be described with reference to the accompanying drawings.

Figure 1:
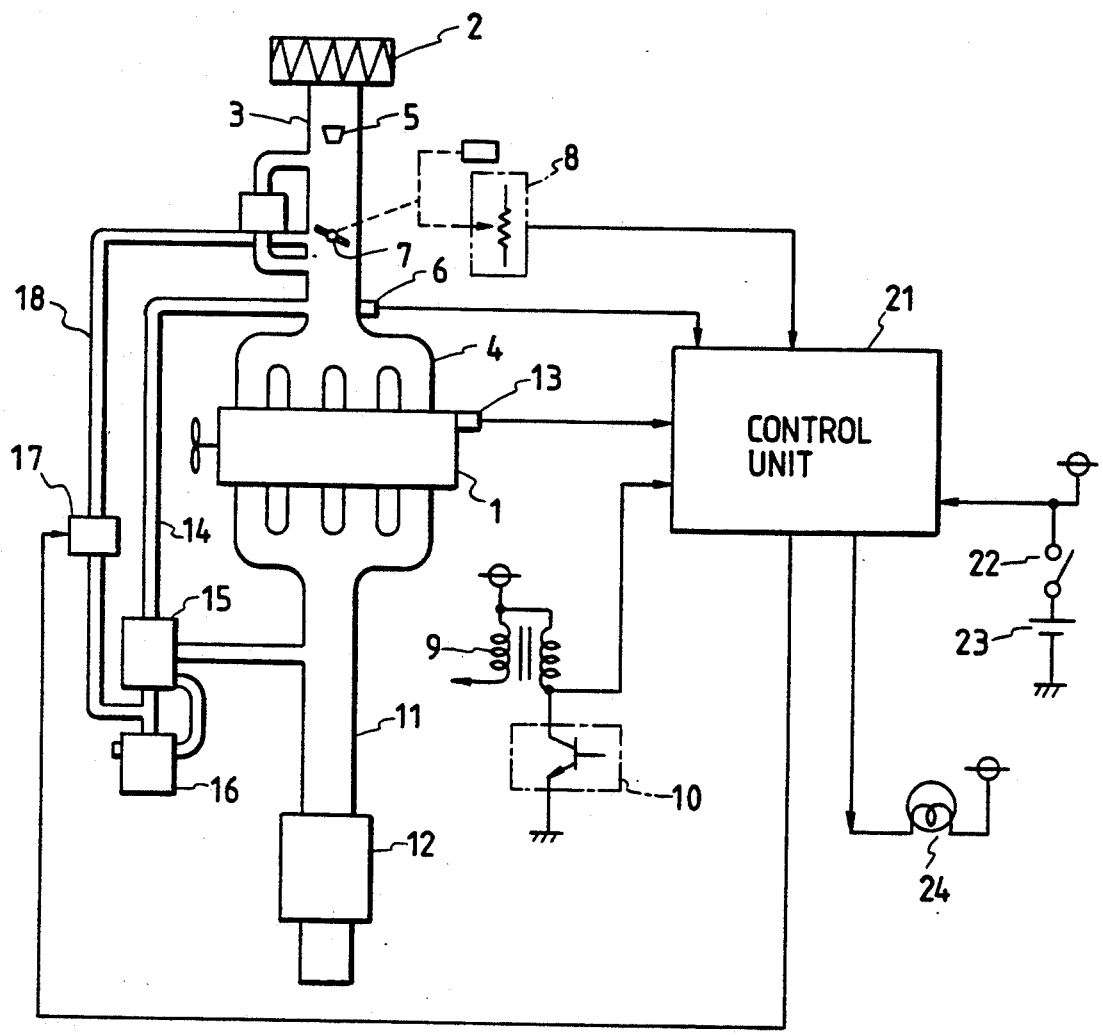
FIG. 1 is a block diagram showing an example in which a troubleshooting system, which is a first embodiment of the invention, is applied to an exhaust gas recirculation (EGR) controller.

FIG. 1 is a block diagram showing an example in which the invention is applied to an exhaust gas recirculation (EGR) controller. The case of a back-pressure EGR controller using a back pressure transducer (BPT) valve is presented and is provided an engine 1, an air cleaner 2, an intake pipe 3, an intake manifold 4, an injector for injecting fuel 5, a pressure sensor 6 for detecting an intake manifold pressure inside the intake manifold 4, a throttle valve 7, a throttle opening sensor 8 for detecting the opening of the throttle valve 7, an ignition coil 9, an igniter 10, an exhaust pipe 11, a catalyzer 12 and a temperature sensor 13 for detecting a temperature of cooling water for the engine 1.

Further, a recirculation pipe 14 recirculates a part of exhaust gas inside the exhaust pipe 11 to the intake pipe 3. An EGR valve 15 serves as a recirculation valve that controls the flow rate of the exhaust gas flowing through the recirculation pipe 14. A BPT valve 16 controls the area of passage of the EGR valve 15. An EGR solenoid 17 controls the control pressure applied to the BPT valve 16 so that the EGR flow amount in the BPT valve 16 can be controlled. An electronic control unit 21, an ignition key switch 22 (hereinafter referred to as "IG switch"), a battery 23 and an alarm lamp 24 for troubleshooting are provided.

Here, the EGR solenoid 17 is connected to a control path 18 between a diaphragm chamber of the EGR valve 15 and the intake pipe 3. The EGR solenoid 17 is energized and de-energized by a signal from the electronic control unit 21 so that the control pressure of the BPT valve 16 can be controlled, whereby the control pressure of the BPT valve 16 becomes equal to the atmospheric pressure to stop the EGR.

Figure 5A:
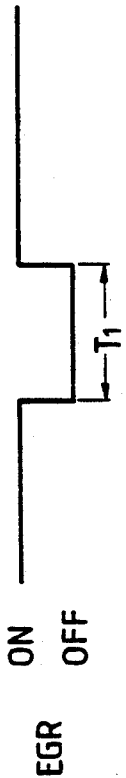
FIGS. 5a and 5b are diagrams illustrative of a change in intake manifold pressure with respect to values of EGR flow amount as the EGR turns on and off in the first embodiment.
Figure 5B:
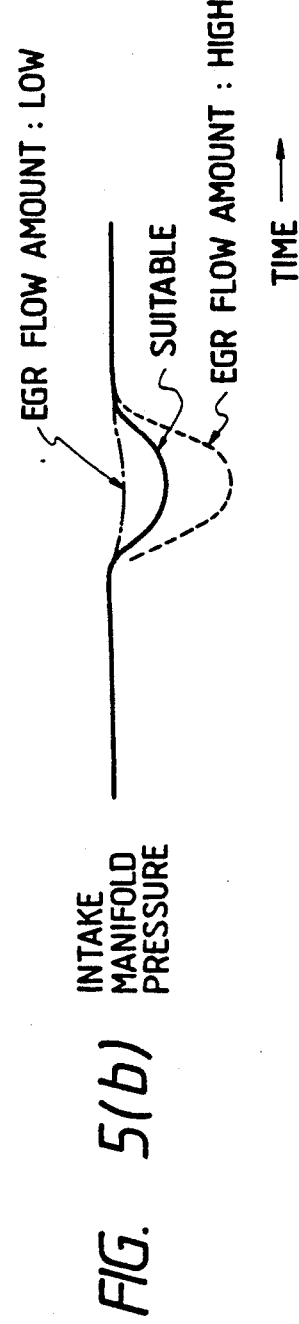

The pressure sensor 6 serves as a means for detecting an operation condition of the engine 1. As shown in FIG. 5, the pressure sensor 6 detects the intake manifold pressure within the intake manifold 4 when the EGR has been turned off, assuming that the EGR-off time is $T_1$. At this point, the intake manifold pressure detected by the pressure sensor 6 varies in accordance with the EGR flow amount as shown in FIG. 5 (b). In FIG. 5 (b), the intake manifold pressure is indicated by one-dot chain line when the EGR flow amount is small, while a broken line when the EGR flow amount is large.

To detect faults of the EGR controller, the electronic control unit 21 temporarily switches the EGR valve 15 from a first state to a second state for a predetermined time. That is, using respective signals from the pressure sensor 6, the throttle opening sensor 8, the ignition coil 9, and the like as inputs, the electronic control unit 21 detects and stores the intake manifold pressures detected by the pressure sensor 6 in accordance with such switching. The first state is such that the area of passage of the EGR valve 15 is wide and the second state is such that the area of passage of the EGR valve is narrow or zero. The electronic control unit 21 then calculates a difference between the intake manifold pressures, i.e., a rate of change or a difference between the maximum and the minimum thereof. The unit 21 then compares the calculated value with a preset value that corresponds to the operation condition to judge whether or not the compared value is within a predetermined range. When it is found from the result of the judgment that the compared value is not within the predetermined range, the electronic control unit 21 issues an alarm.

Figure 6:
FIG. 6 is a diagram showing a relationship between the rate of change of the intake manifold pressure and the EGR flow amount to illustrate the first embodiment.

FIG. 6 shows a relationship between the EGR flow amount and the rate of change of the intake manifold pressure (or the difference between the maximum and the minimum thereof) when the EGR is turned off. The rate of change of the intake manifold pressure exhibits such a characteristic as to increase with increasing EGR flow amount and decrease with decreasing EGR flow amount.

Figure 2:
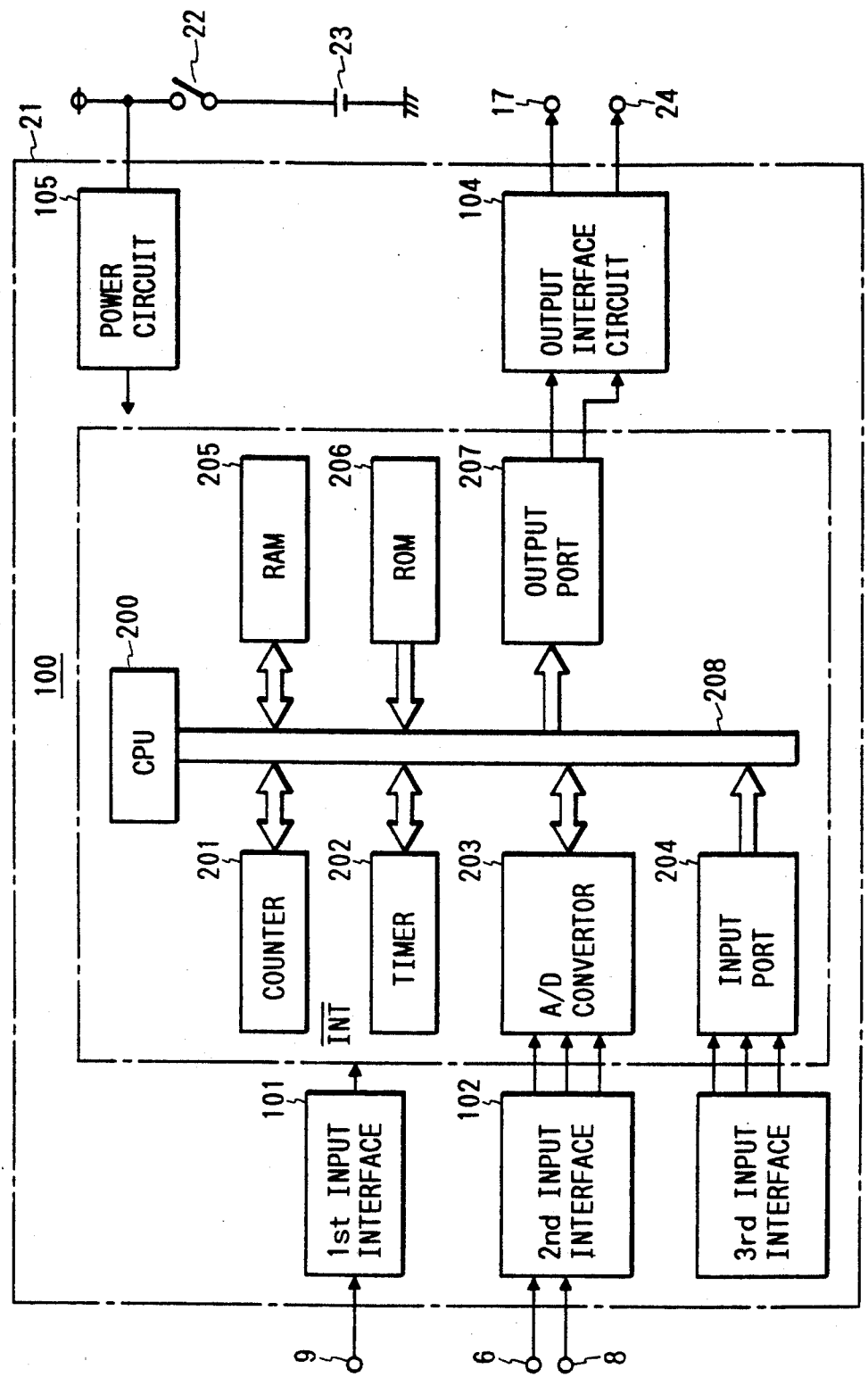
FIG. 2 is a detailed block diagram showing an electronic control unit shown in FIG. 1.

FIG. 2 is a detailed block diagram of the electronic control unit 21. In FIG. 2, a microcomputer 100 includes: a CPU (central processing unit) 200 that calculates controlled quantities and the like of the EGR solenoid 17 in accordance with predetermined programs; a free-learning counter 201 that measures the rotating cycle of the engine 1 and the like; a timer 202 that counts the duty ratio of a drive signal to be applied to the EGR solenoid 17 and the like; an A/D (analog-to-digital) converter 203 that converts analog input signals to digital signals; an input port 204; a RAM (random access memory) 205 that is used as a work memory; a ROM (read only memory) 206 that stores programs; an output port 207 that outputs the drive signal; and a common bus 208.

A first input interface circuit 101 receives respective signals from the ignition coil 9, and the like; a second input interface circuit 102 receives respective signals from the pressure sensor 6, the throttle opening sensor 8, and the like and supplies outputs to the A/D converter 203; an output interface circuit 104 amplifies the drive output from the output port 207 and outputs the amplified drive output to the EGR solenoid 17; a power supply circuit 105 is supplied power of the battery 23 through the IG switch 22. The output of the power supply circuit 105 is used to drive the control unit 21 including the microcomputer 100.

An operation of the above-mentioned first embodiment will be described next with reference to the EGR trouble-shooting flowchart shown in FIG. 7.

Figure 7:
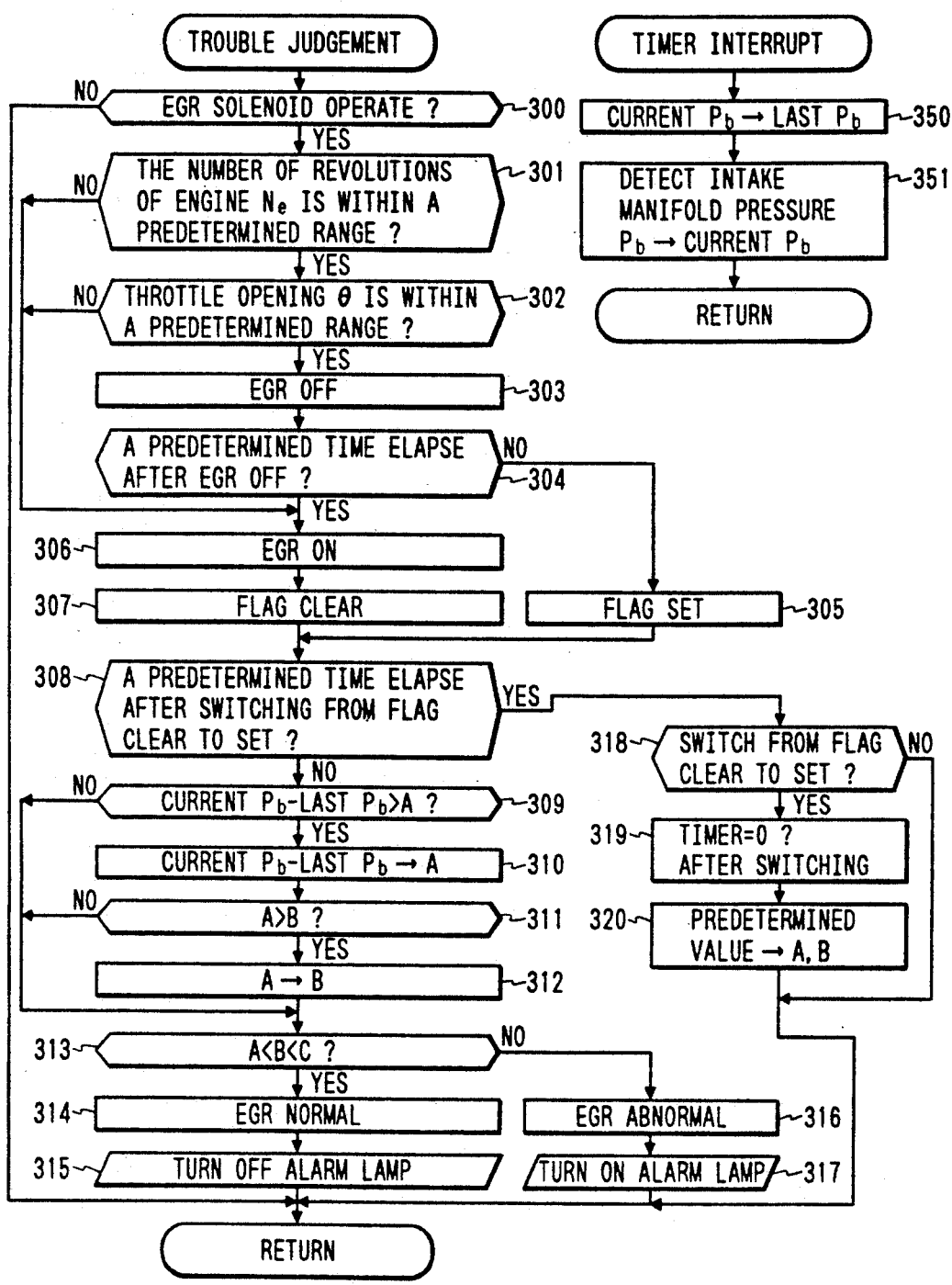
FIGS. 7a and 7b are flowcharts showing exemplary EGR controller troubleshooting processing in the first embodiment.

In FIG. 7, the CPU 200 judges in Step 300 whether or not the EGR solenoid 17 is in operation upon start of the engine 1. If the EGR solenoid 17 is in operation, the CPU then judges whether or not the number of revolutions Ne of the engine is within a predetermined range in Step 301. If the value Ne is within the predetermined range, the CPU judges whether or not the throttle opening $\theta$ of the throttle valve 7 is within a predetermined range in Step 302. If the value $\theta$ is within the predetermined range, the CPU then advances to a next Step 303. After judging that the engine 1 is in stable conditions in these processing steps, the CPU turns off the EGR solenoid 17, i.e., the CPU turns off the EGR in Step 303 and advances to a next Step 304.

Figures 3A, 3B, 4A, 4B:
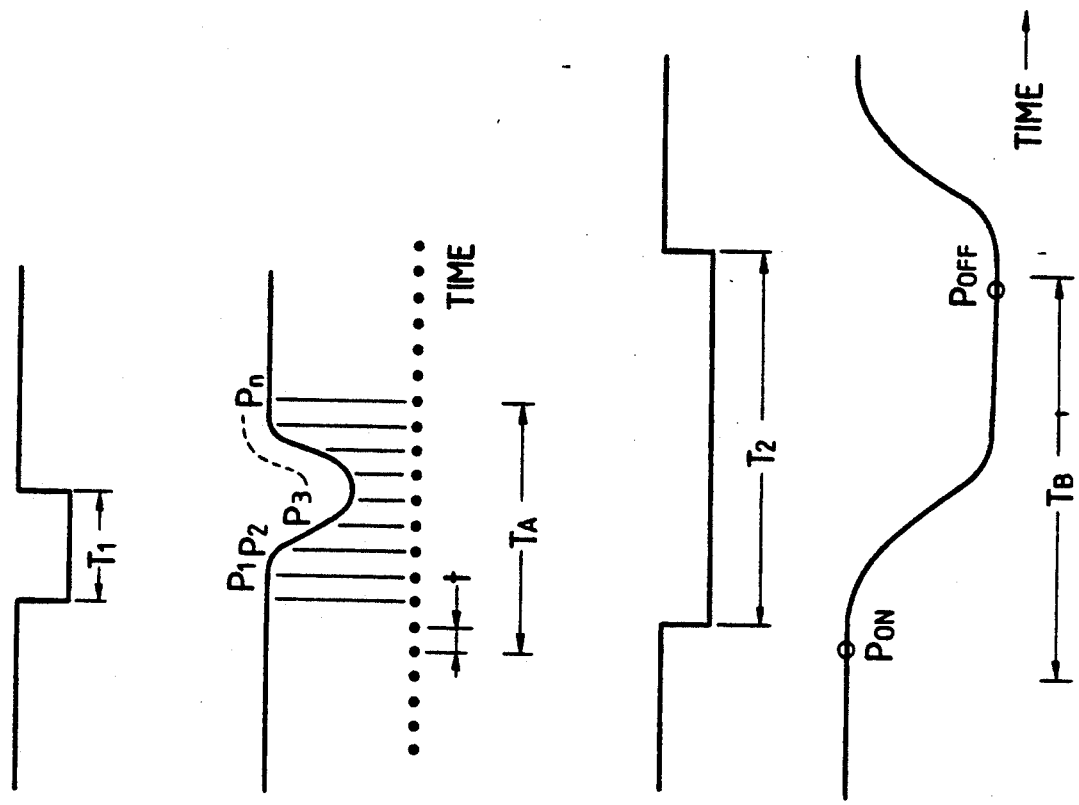
FIGS. 3a and 3b are diagrams illustrative of an exemplary change in intake manifold pressure as EGR turns on and off in the first embodiment.
FIGS. 4a and 4b are diagrams illustrative of an exemplary change in intake manifold pressure as EGR turns on and off in an conventional example.

In Step 304, the CPU 200 judges a time that has elapsed after the EGR has been turned off. If such time is within a predetermined time $T_1$, then the CPU sets a flag to that effect (Step 305), while if such time is longer than the predetermined time $T_1$, then the CPU turns on the EGR and clears the flag (Steps 306, 307), and advances to a next Step 308. In Step 308 the CPU judges whether or not the predetermined time $T_1$ has elapsed after the flag setting has been switched from the cleared state to the set state. If the time that has elapsed is within the predetermined time $T_1$, the CPU calculates an increment in intake manifold pressure of the pressure sensor 6 while the EGR is being turned off. That is, using the switching of the flag setting from the cleared state to the set state as an intake manifold pressure sampling judgment start timing for the pressure sensor 6, intake manifold pressures $P_1$ to $P_n$ are sampled every predetermined time t as shown in FIG. 3 (b). The sampling continues after the termination of the period $T_1$, as illustrated in FIG. 3(b), in order to detect the change in value of the intake manifold pressure so that a minimum value can be obtained. Therefore, the sampling of the intake manifold pressure occurs during time period $T_1$ and a delay time during which the EGR is turned on and the change in the intake manifold air amount is detected. The CPU then compares a difference between a current value Pb and a last value Pb, which are the sampled values, with a predetermined value A, and calculates the maximum B of a rate of change based on such difference to thereby update the rate of change in intake manifold pressure (Steps 309 to 312).

As a result, the CPU 200 judges the calculated maximum B in Step 313, and if the maximum B is between the predetermined upper value A and lower value C, then the CPU, judging that the EGR controller is normal in Step 314, sets the flag to that effect and turns off the alarm lamp 24 (Step 315). If, on the other hand, the maximum B is out of the predetermined range between the values A and C, then the CPU, judging that the EGR controller is abnormal, sets the flag to that effect and turns on the alarm lamp 24 (Steps 316, 317).

At this point, after the predetermined time $T_1$ has elapsed from the switching of the flag setting from the cleared state to the set state, the CPU 200 detects such switching, resets the timer after such switching, and sets predetermined values A, B (Steps 316 to 320). Also, timer interrupt processing is activated every predetermined time to execute an interrupt, in which a current value Pb into which a value detected by the pressure sensor 6 after the switching of the flag setting from the cleared state to the set state is sampled is applied to update a last value Pb and in which an intake manifold pressure after such switching is detected to use the detected value as the current value Pb (Steps 350, 351).

Thus, as shown in FIG. 3, the first embodiment is characterized as turning off the EGR for the predetermined time $T_1$ after an EGR-on period, sampling the intake manifold pressure for the sampling time t thereafter, and detecting faults of the EGR controller from a rate of change of the sampled intake manifold pressure. As a result, the time interval requiring stable operation of the engine becomes $T_A$, which is shorter than a conventional time interval $T_B$ shown in FIG. 4 ($T_A < T_B$). Also, the time interval $T_1$ during which the EGR is being turned off becomes shorter than a conventional EGR-off time $T_2$ ($T_1 < T_2$), thus eliminating the driveability problem.

While the case of using the rate of change in intake manifold pressure when the EGR turns on and off has been described in the above-mentioned first embodiment, application of the invention is not limited thereto. The invention may also be applied to a case where a rate of change in other values detected by the operation condition detecting means is calculated to detect faults of the EGR controller.

As described above, the troubleshooting system according to the first embodiment of the invention is designed to measure the EGR flow amount by a change in intake manifold pressure, such change taking place when the EGR turns on and off with the EGR-off time maintained at a constant value. Therefore, the EGR-off time can be shortened, thus not only eliminating the driveability problem but also preventing deterioration of the exhaust gas condition. In addition, the time during which the operation conditions of the engine when the EGR is turned on and off must be kept stable can also be shortened, thus providing the advantage of increasing troubleshooting chance.

A second embodiment of the invention will be described next with reference to the accompanying drawings.

Figure 8:
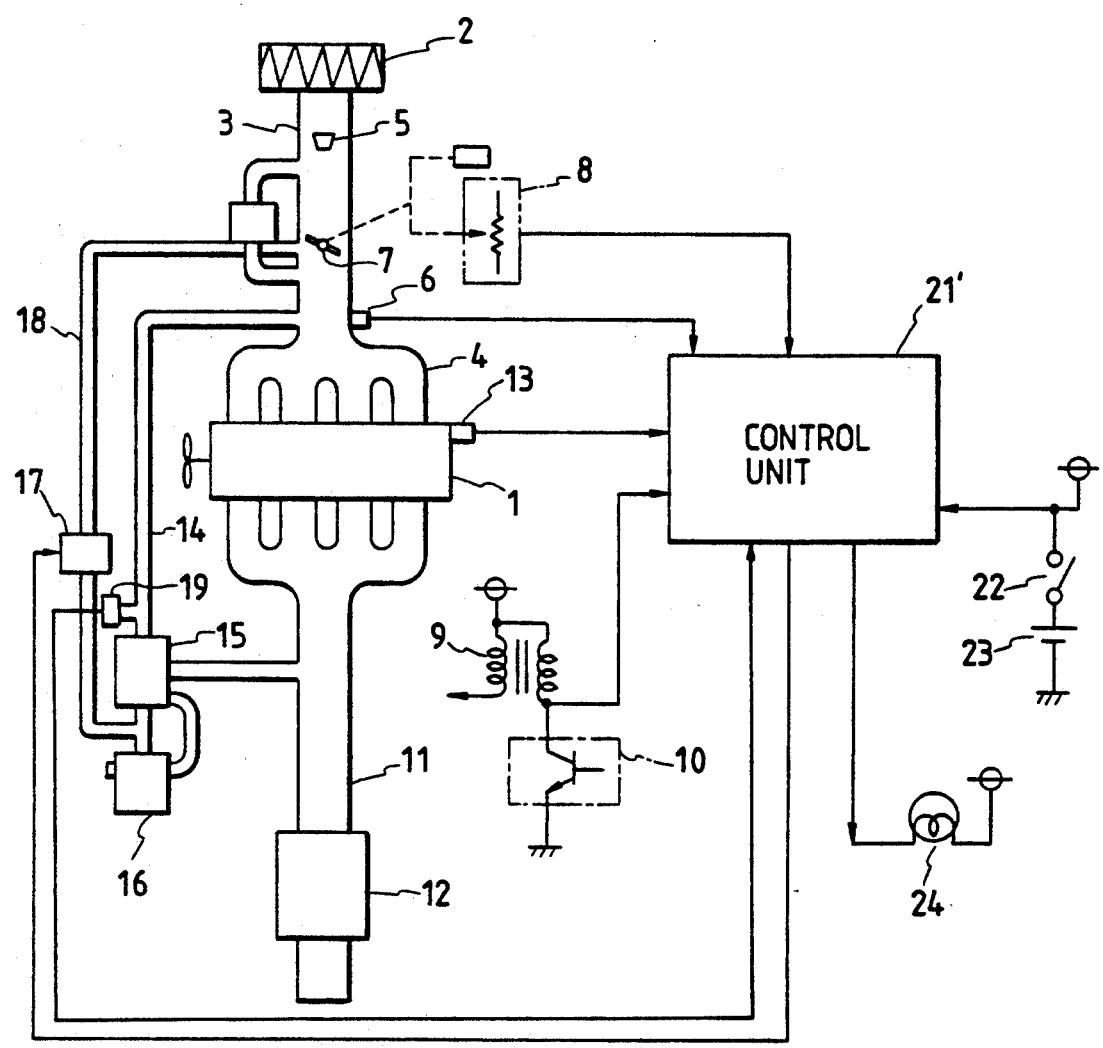
FIG. 8 is a block diagram showing an example in which a troubleshooting system, which is a second embodiment of the invention, is applied to the EGR controller.

FIG. 8 is a block diagram showing a troubleshooting system, which is the second embodiment of the invention. Elements similar to those shown in FIG. 1 are designated by the same reference numerals. In FIG. 8, the pressure sensor 6 is defined as a first pressure sensor. A second pressure sensor 19 is arranged to measure pressure adjacent to the outlet of the EGR valve 15.

The first and second pressure sensors 6, 19 are designed to measure a differential pressure produced at two points. One point is located adjacent to the outlet of the EGR valve 15 and the other to the inlet of the intake manifold 4 which is on the side of the intake pipe 3 when the exhaust gas recirculates at an EGR flow amount through the recirculation pipe 14. As shown in FIG. 10, these pressure sensors 6, 19 detect an intake manifold pressure Pb (broken line) and an EGR valve outlet pressure $P_{OUT}$ (solid line) when the EGR is turned off for the predetermined time $T_1$. As shown in FIG. 11, the values detected by the pressure sensors 6, 19 at these points are varied in accordance with the magnitude of the EGR flow amount. FIG. 11 (b) shows the intake manifold pressures when the EGR flow amount is small, while FIG. 11 (c) when the EGR flow amount is large.

To detect faults of the EGR controller, an electronic control unit 21' temporarily switches the passage area of the EGR valve 15 from the first wide state to the second narrow or zero state for a predetermined time. That is, using respective signals from the first and second pressure sensors 6, 19, the throttle opening sensor 8, the ignition coil 9, and the like as inputs, the electronic control unit 21' detects and stores the values detected by the first and second pressure sensors 6, 19, i.e., the intake manifold pressure Pb and the EGR valve outlet pressure $P_{OUT}$ at the two points in accordance with such switching. The electronic control unit 21' then calculates either a rate of change of the pressures at the two points or a difference in time during which the pressures at these two points reach the same level, and judges whether or not the rate of change of the pressures at the two points is within a predetermined range or whether or not the difference in time during which the pressures at these two points reach the same level is within a predetermined range. And if it is found from the above judgments that the values are out of these predetermined ranges, the electronic control unit issues an alarm.

Figure 9:
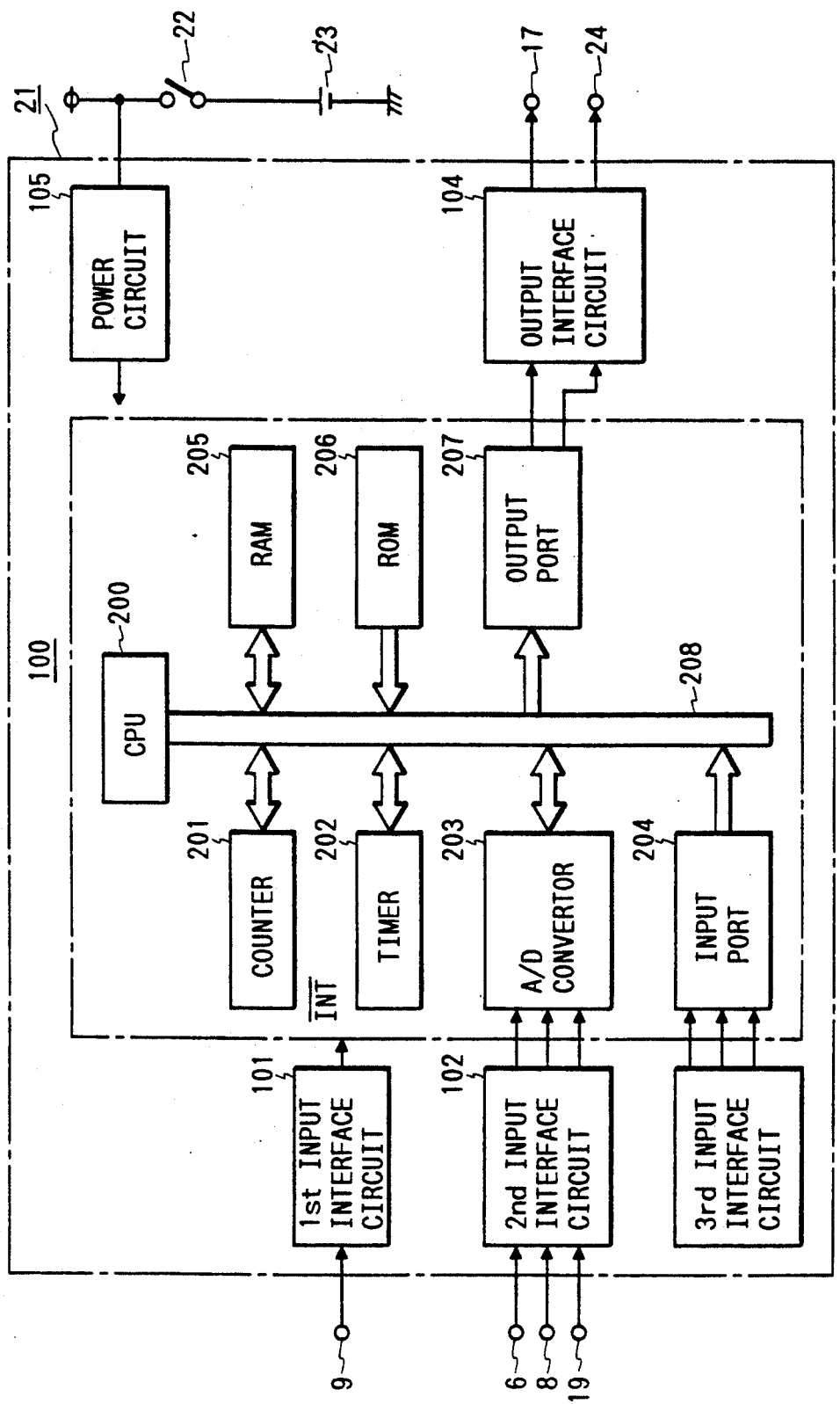
FIG. 9 is a detailed block diagram showing an electronic control unit shown in FIG. 8.

FIG. 9 is a detailed block diagram of the electronic control unit 21'. Elements similar to those shown in FIG. 2 are designated by the same reference numerals. In FIG. 9, respective signals from the first and second pressure sensors 6, 19, the throttle opening sensor 8, and the like are applied to the second interface circuit 102.

An operation of the second embodiment will be described with reference to the EGR troubleshooting flowchart shown in FIG. 14.

In FIG. 14, the CPU 200 judges whether or not the EGR solenoid 17 is in operation in Step 1300 upon start of the engine 1. If the EGR solenoid 17 is in operation, then the CPU judges whether or not the number of revolutions Ne of the engine is within a predetermined range in Step 1301. If the value Ne is within the predetermined range, the CPU judges whether or not the throttle opening $\theta$ of the throttle valve 7 is within a predetermined range in Step 1302. If the throttle opening $\theta$ is within the predetermined range, the CPU then advances to a next Step 1303. After judging that the engine 1 is in stable conditions in these processing steps, the CPU turns off the EGR solenoid 17, i.e., the CPU turns off the EGR, in Step 1303 and advances to a next Step 1304.

In Step 1304 the CPU 200 judges a time that has elapsed after the EGR has been turned off. If such time is within the predetermined time $T_1$, the CPU sets a flag to that effect (Step 1305), while if such time is longer than the predetermined time $T_1$, the CPU turns on the EGR and clears the flag (Steps 1306, 1307), and advances to a next Step 1308. In Step 1308 the CPU judges whether or not the predetermined time $T_1$ has elapsed after the flag setting has been switched from the cleared state to the set state. If the time that has elapsed is within the predetermined time $T_1$, the CPU advances to a next Step 1309. The CPU executes timer interrupt processing after the switching of the flag setting from the cleared state to the set state in Step 1308 (Steps 1350, 1351).

That is, the CPU 200 reverses the flag setting for a predetermined time (Step 1350), and executes interrupt processing that intervenes every predetermined time (Step 1351). The interrupt processing involves the operation of not only detecting an intake manifold pressure Pb from the first pressure sensor 6 and storing the detected pressure Pb, but also detecting an EGR valve outlet pressure $P_{OUT}$ from the second pressure sensor 19 and storing the detected pressure $P_{OUT}$. And the CPU further detects a differential pressure A' between the intake manifold pressure Pb and the EGR valve outlet pressure $P_{OUT}$ (Step 1309). If the differential pressure A' is greater than zero, then the CPU judges not only that there has been a change in pressure, but also that such change has been terminated. The CPU then calculates the differential pressure A' every time the pressures are detected while reversing the flag setting for the predetermined time and integrates the increment in pressure S between the two points based on the calculated differential pressure A'. (Steps 1310 to 1312).

As a result, the CPU 200 judges the increment S in Step 1313, and if the value S is within predetermined upper and lower values. B', C', then the CPU, judging that the EGR controller is normal in Step 1314, sets the flag to that effect, and turns off the alarm lamp 24 (Step 1315). If, on the other hand, the increment S is out of the range defined by the values B', C', then the CPU, judging that the EGR controller is abnormal, sets the flag to that effect, and turns on the alarm lamp 24 (Steps 1316, 1317). However, when the predetermined time $T_1$ has elapsed after the flag setting has been switched from the set state to the cleared state in Step 1308, the CPU detects such switching, resets the timer after such switching, and sets the increment in pressure S to an initial value (zero) (Steps 1318 to 1320).

Thus, as shown in FIG. 10, the second embodiment is characterized as turning off the EGR for the predetermined time $T_1$ after an EGR-on period, detecting the intake manifold pressure Pb from the first pressure sensor 6 and the EGR valve outlet pressure $P_{OUT}$ from the second pressure sensor 19 thereafter to thereby obtain the differential pressure between the two points, and detecting faults of the EGR controller from the increment S between the two points. As a result, the time interval requiring stable operation of the engine becomes $T_A$, which is shorter than the conventional time interval $T_B$ shown in FIG. 4 ($T_A < T_B$). Also, the time interval $T_1$ during which the EGR is being turned off becomes shorter than the conventional EGR-off time $T_2$ ($T_1 < T_2$), thus eliminating the driveability problem.

Figures 15A, 15B:
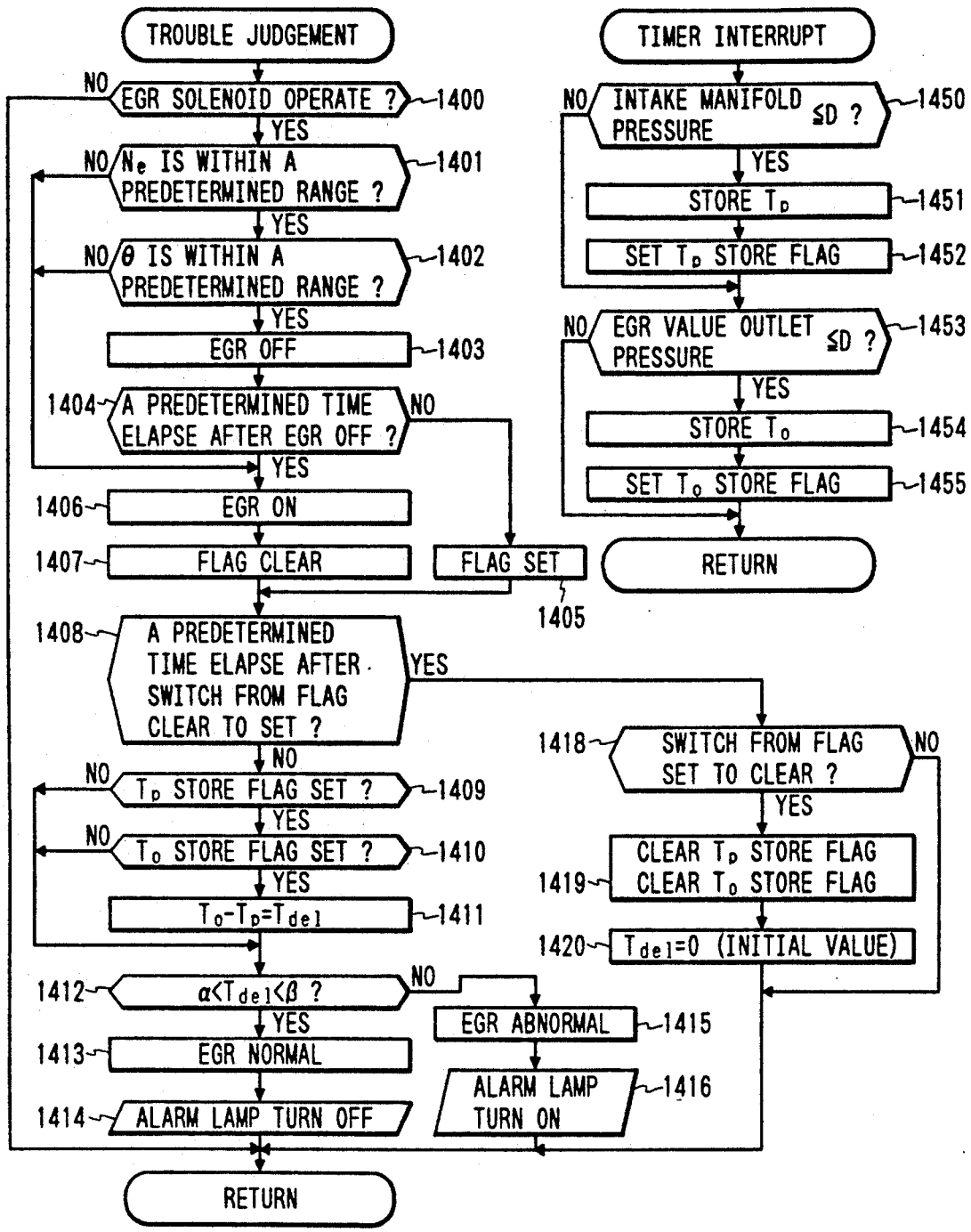
FIGS. 15a and 15b are flowcharts showing exemplary EGR controller troubleshooting processing in another mode of the second embodiment.

FIG. 15 is an EGR troubleshooting flowchart for another mode of the second embodiment. This is the case of troubleshooting the EGR controller with a time delay in pressure change between the two points.

In FIG. 15, the CPU 200 similarly judges the operation of the EGR solenoid 17, the number of revolutions Ne of the engine as well as whether or not the throttle opening $\theta$ of the throttle valve 7 is within a predetermined range to thereby judge that the engine 1 is in stable conditions once the engine 1 has been activated (Steps 1400 to 1402). Then, the CPU judges that the predetermined time $T_1$ has elapsed after the EGR has been turned off, sets or resets the flag according to the result of the judgment (Steps 1403 to 1407), and advances to a next Step 1408. In Step 1408 the CPU judges whether or not the predetermined time $T_1$ has elapsed after the flag has been cleared, and if the time that has elapsed is within the predetermined time $T_1$, then the CPU advances to a next Steps 1409, 1410. At this point, the CPU executes timer interrupt processing after the switching of the flag setting from the cleared state to the set state in Step 1408 (Steps 1450 to 1455).

Figure 12A:
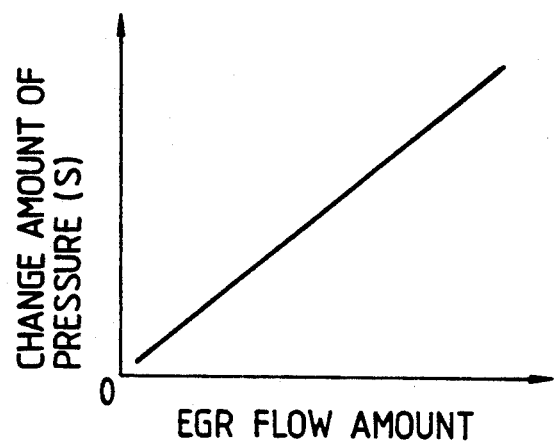
FIGS. 12a and 12b are diagrams showing a relationship between the increment in pressure and the EGR flow amount to illustrate the second embodiment.
Figure 12B:
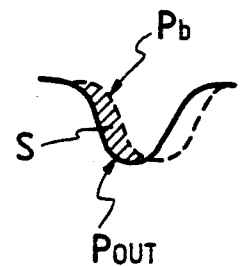
Figure 13A:
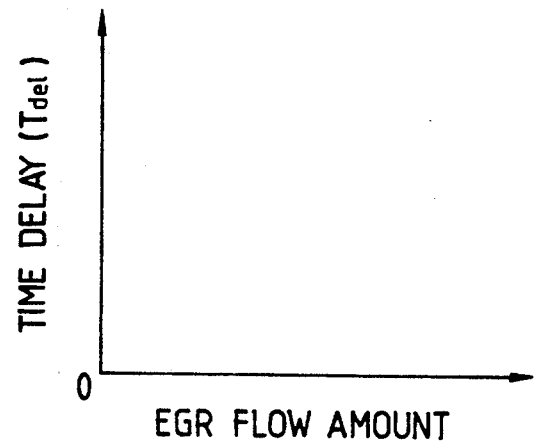
FIGS. 13a and 13b are diagrams showing a relationship between a time delay associated with a change in pressure and the EGR flow amount to illustrate the second embodiment.
Figure 13B:
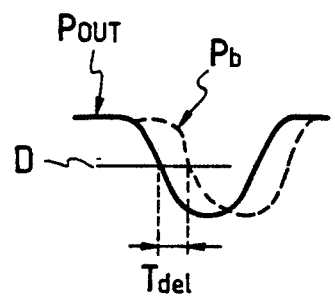

That is, the CPU 200 detects the intake manifold pressure Pb from the first pressure sensor 6. If the detected value is equal to or smaller than a predetermined intake manifold pressure value D when the EGR is turned on (see FIG. 12 (b)), then the CPU stores a time $T_P$ at which the intake manifold pressure Pb has been detected and sets the corresponding flag (Steps 1450 to 1452). The CPU further detects the EGR valve outlet pressure $P_{OUT}$ from the second pressure sensor 19. If the detected value is equal to or smaller than the above-mentioned predetermined value D, the CPU stores a time $T_O$ at which the EGR valve outlet pressure $P_{OUT}$ has been detected and sets the corresponding flag (Steps 1453 to 1455). Here, values registered in the free learning counter 201 are stored as the respective times $T_P$, $T_O$. Accordingly, the CPU judges the flags respectively indicating that the times $T_P$ and $T_O$ have been stored in Steps 1409, 1410, and finds thereafter a difference between the time $T_P$ at which the intake manifold pressure Pb has been detected and the time $T_O$ at which the EGR valve outlet pressure $P_{OUT}$ has been detected, i.e., a difference in the time during which the pressures at the two points reach the same level, so that a time delay $T_{del}$ in pressure change between the two points is calculated in Step 1411.

As a result, the CPU 200 judges the calculated value $T_{del}$ in Step 1412, and if the value $T_{del}$ is within predetermined upper and lower values $\alpha$, $\beta$, then the CPU, judging that the EGR controller is normal in Step 1413, sets the flag to that effect and turns off the alarm lamp 24 (Step 1414). If, on the other hand, the value $T_{del}$ is out of the range defined by the values $\alpha$, $\beta$, then the CPU, judging that the EGR controller is abnormal, sets the flag to that effect and turns on the alarm lamp 24 (Steps 1415, 1416). However, as the predetermined time $T_1$ has elapsed after the flag setting has been switched from the set state to the cleared state in Step 1408, the CPU detects such switching, clears the flags respectively indicating that the times $T_P$ and $T_O$ have been stored, resets the time delay $T_{del}$ to set the initial value thereof to zero (Steps 1417 to 1420).

Thus, this mode of embodiment is characterized as turning off the EGR for the predetermined time $T_1$ after an EGR-on period, detecting the intake manifold pressure Pb of the first pressure sensor 6 and the EGR valve outlet pressure $P_{OUT}$ from the second pressure sensor 19 thereafter to thereby obtain a time delay $T_{del}$ in pressure change between the two points, and detecting faults of the EGR controller from such time delay $T_{del}$. Accordingly, the same advantage as that of the second embodiment can be obtained.

While the case of arranging the pressure sensors 6, 19 adjacent to the outlet of the EGR valve 15 and to the inlet of the intake pipe 3 as the means for detecting pressures at two arbitrary points in the recirculation pipe 14 has been described in the second embodiment, application of the invention is not limited thereto. The invention may similarly be embodied by detecting pressures at two arbitrary points in the recirculation pipe 14 from the inlet of the EGR valve 15 to the exhaust pipe 11.

As described above, the troubleshooting system according to the second embodiment of the invention is designed to measure the EGR flow amount by a change in pressure between the two points in the recirculation pipe when the EGR turns on and off in order to detect faults of the EGR controller based on the turning on and off of the EGR. Therefore, the time during which it is required that the engine be in stable conditions when the EGR is turns on and off can be shorter than a conventional time, which provides an advantage that troubleshooting chances are more than with the conventional system.

A third embodiment of the invention will be described next with reference to the accompanying drawings. Since elements in the third embodiment correspond to those shown in FIG. 1 except for the electronic control unit 21, the description of these elements will be omitted.

Further, since the configuration of the electronic control unit 21 is the same as that shown in FIG. 2, the description thereof will be omitted, while an operation thereof is as follows. The electronic control unit 21 receives signals from the pressure sensor 6, the throttle opening sensor 8, the ignition coil 9, and the like. The electronic control unit 21 not only stores a first intake manifold pressure detected by the pressure sensor 6 when the EGR valve 15 is set to the first state in which the passage area of the EGR valve 15 is wide, i.e., when EGR is turned on, but also stores a second intake manifold pressure detected by the pressure sensor 6 when the EGR valve 15 is set to the second state in which the passage area of the EGR valve 15 is narrow or zero, i.e., when the EGR is turned off, so that the electronic control unit 21 can make a fault judgment based on the detected first and second intake manifold pressures. And in such fault judgment, the EGR-off time is caused to vary in accordance with a load.

An operation of the third embodiment will be described with reference to the EGR troubleshooting flowchart shown in FIG. 17.

Figure 17A:
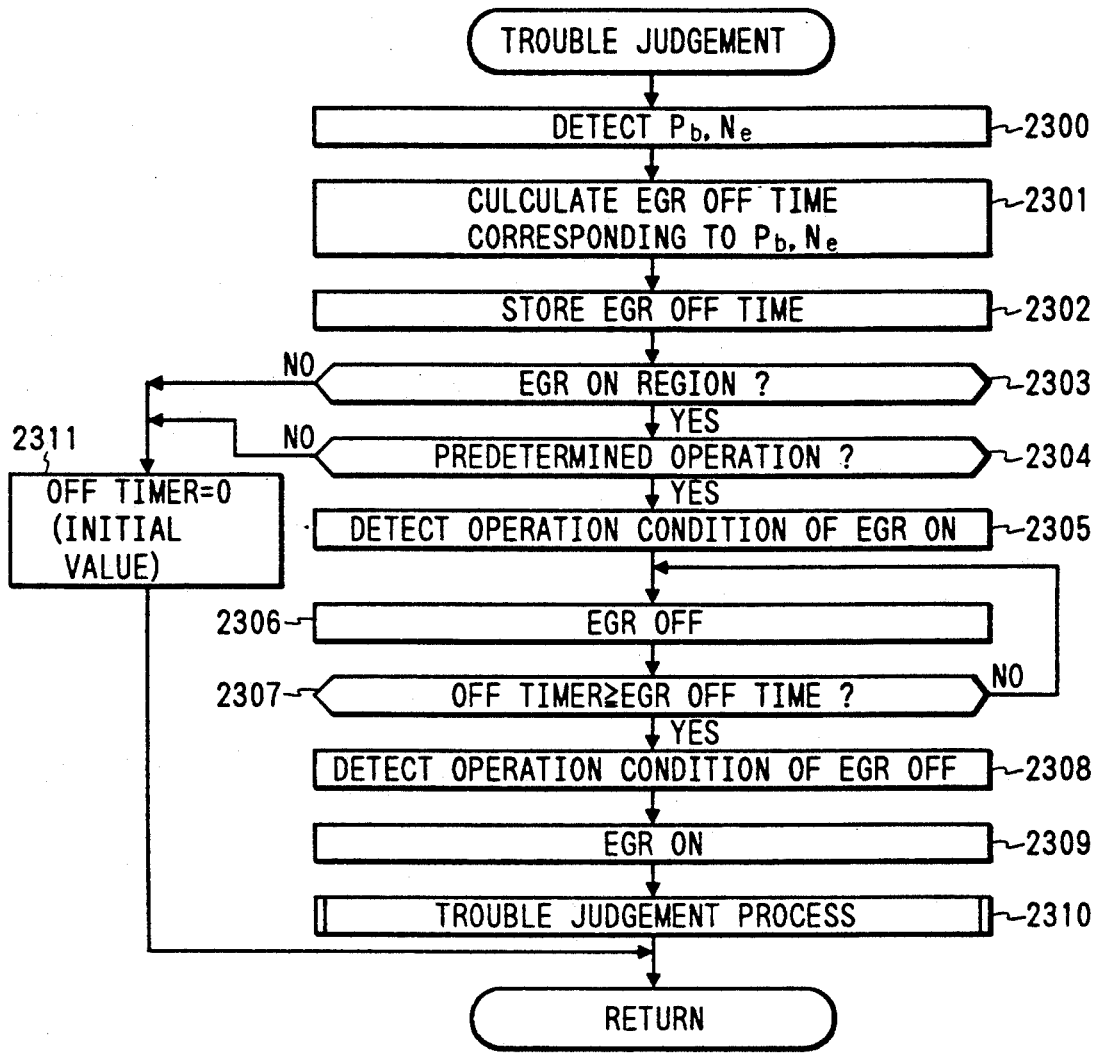
FIGS. 17a and 17b are flowcharts showing exemplary EGR troubleshooting processing of the third embodiment.
Figure 17B:
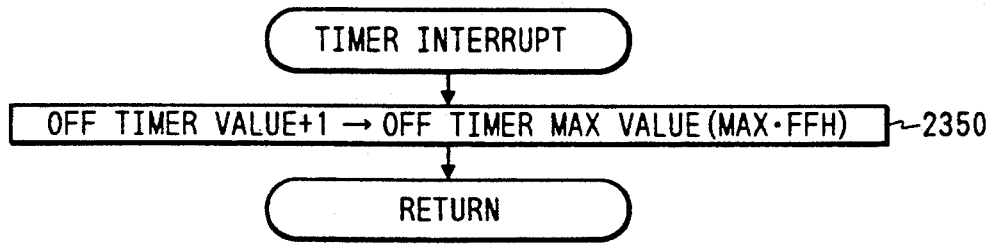

In FIG. 17, the CPU 200 detects not only an intake manifold pressure Pb detected by the pressure sensor 6 but also the number of revolutions Ne of the engine in Step 2300 upon start of the engine 1. The CPU then calculates an EGR-off time Ta in accordance with the values Pb and Ne and stores the calculated EGR-off time Ta (Steps 2301, 2302). Then, the CPU judges an EGR-on region in Step 2303 and judges that the engine 1 is in predetermined stable operation conditions in Step 2304.

At this point, if these conditions are not met, the CPU 200 resets an EGR-off timer value to zero (Step 2311), while if these conditions are met, the CPU advances to a next Step 2305 in which an operation condition, e.g., an intake manifold pressure at the time EGR turns on is detected. Further, the CPU turns off the EGR in Step 2306 and compares the EGR-off timer value with the EGR-off time Ta in a next Step 2307. If the EGR-off timer value exceeds the EGR-off time Ta, then the CPU detects an operation condition, e.g., an intake manifold pressure when the EGR turns off in a next Step 2308. The CPU then turns on the EGR in Step 2309, and executes troubleshooting processing based on the intake manifold pressures detected when the EGR turns on and off (Step 2310). At this point, timer interrupt processing is activated to perform the operation of positively incrementing the EGR-off timer value by 1 and clipping the EGR-off timer value with the maximum thereof (MAX.FFH) every predetermined time (e.g., 50 msec) at the time the EGR is switched from the on state to the off state (Step 2350).

Figure 16A:
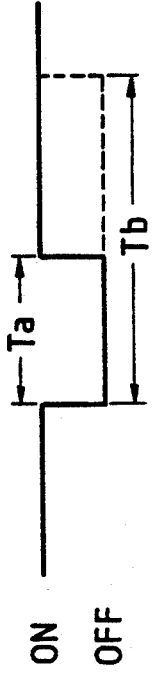
FIGS. 16a and 16b are diagrams illustrative of a relationship between an EGR-off time and a degree of shock as EGR turns on and off in a third embodiment.
Figure 16B:
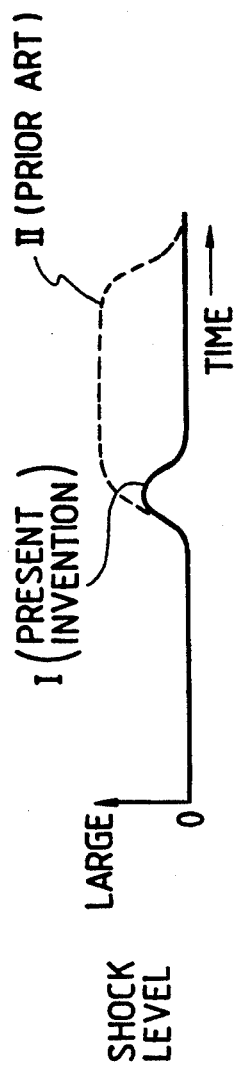

Thus, the third embodiment is characterized as selecting the EGR-off time Ta in accordance with the intake manifold pressure Pb and the number of revolutions Ne of the engine. Accordingly, the EGR-off time Ta can be shortened compared with a conventional EGR-off time Tb as shown in FIG. 16 (a). Thus, comparing the degree of shock in terms of the driveability in the EGR-off time of this embodiment with that in the conventional EGR-off time under the same loads, the degree of shock indicated by a solid line I of this embodiment is significantly smaller than the conventional degree of shock indicated by a broken line II as is apparent from FIG. 16 (b), thereby leaving the operator free from shock.

While the case of using the intake manifold pressure and the number of revolutions of the engine has been described in the third embodiment, application of the invention is not limited thereto. It may be in accordance with other values detected by the operation condition detecting means such as the intake manifold pressure that the EGR-off time is varied to obtain the same advantage as the third embodiment.

As described above, the troubleshooting system according to the third embodiment of the invention is designed to switch the EGR-off time depending on the load in order to detect faults of the EGR controller based on the turning on and off of the EGR. Therefore, the EGR-off time can be shortened, and this contributes to effectively ridding the operator of shock in terms of driveability.

A fourth embodiment of the invention will be described with reference to the accompanying drawings. Since elements in the third embodiments correspond to those shown in FIG. 1 except for the electronic control unit 21, the description of these elements will be omitted.

Further, since the configuration of the electronic control unit 21 is the same as that shown in FIG. 2, the description thereof will be omitted, while an operation thereof is as follows. The electronic control unit 21 receives signals from the pressure sensor 6, the throttle opening sensor 8, the ignition coil 9, and the like. The electronic control unit 21 not only stores a first intake manifold pressure detected by the pressure sensor 6 when the EGR valve 15 is set to the first state in which the passage area of the EGR valve 15 is wide, i.e., when EGR is turned on, but also stores a second intake manifold pressure detected by the pressure sensor 6 when the EGR valve 15 is set to the second state in which the passage area of the EGR valve 15 is narrow or zero, i.e., when the EGR is turned off, so that the electronic control unit 21 can make a fault judgment based on the detected first and second intake manifold pressures. And such fault judgment is carried out in a predetermined load region with respect to such loads as the intake manifold pressure and the number of revolutions of the engine. The predetermined load region is a region excluding a high-load region having a large pressure loss in the recirculation pipe 14 and a low-load region having a small EGR flow amount in the recirculation pipe 14.

An operation of the fourth embodiment will be described with reference to FIGS. 18 to 20.

Figure 18:
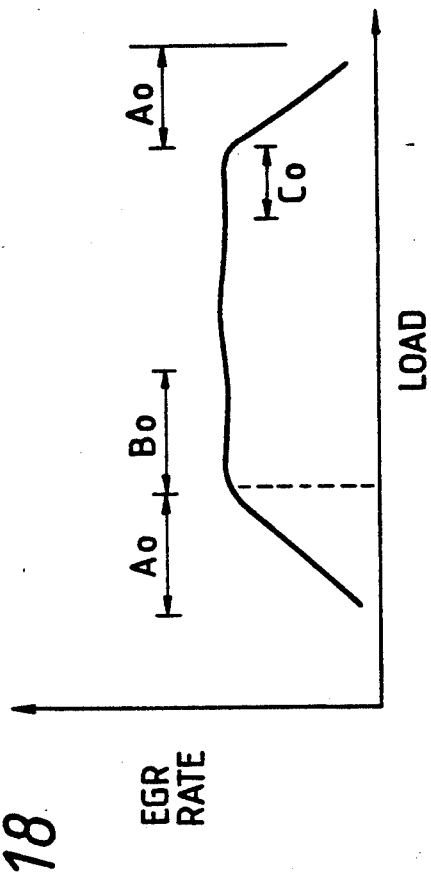
FIG. 18 is a diagram illustrative of a relationship between the EGR rate and a load to be controlled by a back pressure transducer (BPT) valve in the EGR controller in a fourth embodiment.
Figure 19:
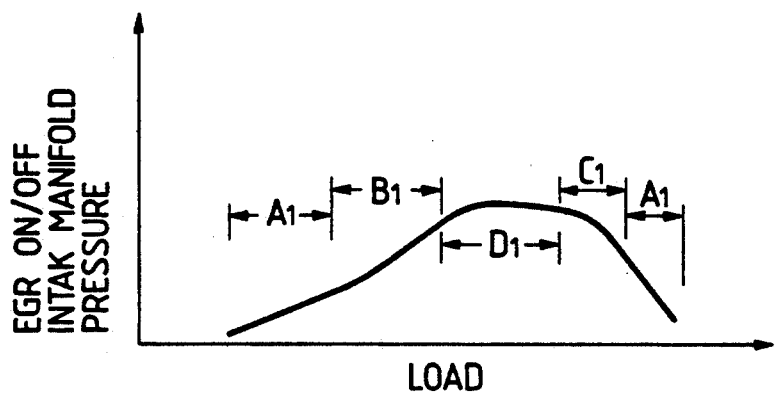
FIG. 19 is a diagram illustrative of a relationship between a difference in intake manifold pressure and the load as EGR turns on and off in the fourth embodiment.

FIG. 18 is a diagram showing a relationship between an EGR rate controlled by a BPT valve of the EGR controller and the load. More specifically, a case where the EGR rate is controlled to a constant value by the BPT valve 16 is presented. Here, the EGR rate is expressed as follows;

$$EGR \text{ rate} = \frac{EGR \text{ flow amount}}{\text{amount of air sucked} + EGR \text{ flow amount}} \times 100\%$$

The loads are the intake manifold pressure and the number of revolutions of the engine. A relationship between the difference in intake manifold pressure when the EGR turns on and off and the load is shown in FIG. 19. In FIG. 19, symbol $A_1$ indicates a region corresponding to a low EGR rate region $A_O$ in FIG. 18, and in such region the difference in intake manifold pressure is small. Symbol B similarly indicates a region corresponding to a constant EGR rate region $B_O$ in FIG. 18, and in such region the EGR flow amount is small because of a small amount of air sucked and the difference in intake manifold pressure is small. Symbol $C_1$ indicates a region corresponding to a constant EGR rate region $C_O$ in FIG. 18, and in such region the EGR flow amount is large but the difference in intake manifold pressure is small because of a large pressure loss in the recirculation pipe 14.

Thus, in the invention a troubleshooting system, which detects faults of the EGR controller based on the turning on and off of EGR, is designed to make a fault judgment in a predetermined region excluding the regions $A_1$ and $B_1$, each having a low EGR flow amount, as well as a high-load region $C_1$ having a large loss in the recirculation pipe. An operation of such troubleshooting system will be described with reference to the EGR troubleshooting flowchart shown in FIG. 20.

Figure 20:
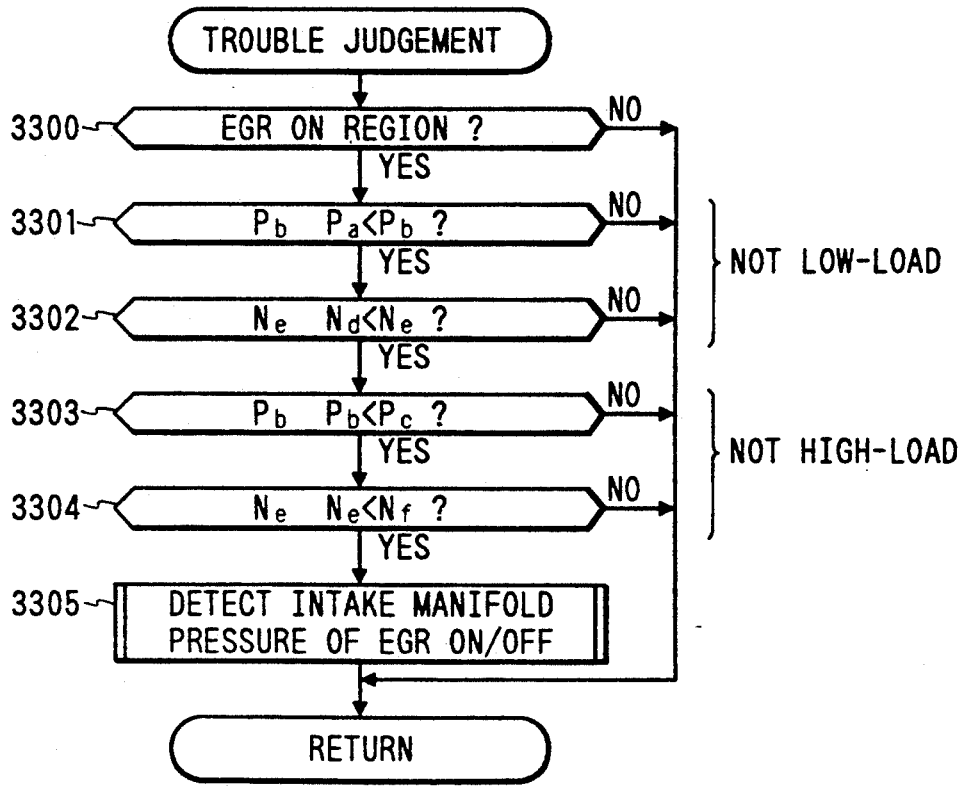
FIG. 20 is a flowchart showing exemplary EGR troubleshooting processing of the fourth embodiment.

That is, in FIG. 20 the CPU 200 judges, upon start of the engine 1, whether or not the region is the EGR-on region in Step 3300. If the region is the EGR-on region, then the CPU advances to next Steps 3301, 3302. Thus, the CPU compares not only an intake manifold pressure Pb detected by the pressure sensor 6 with a predetermined value Pa that has already been set so as to correspond to the low-EGR-flow-rate regions $A_1$, $B_2$ in Step 3301, but also a number of revolutions Ne of the engine with a predetermined value Nd that similarly has already been set so as to correspond to the regions $A_1$, $B_1$ in Step 3302.

At this point, the CPU 200, judging that the loads satisfying these conditions are not low loads, advances to next Steps 3303, 3304. Thus, the CPU not only compares the intake manifold pressure Pb with a predetermined value Pc set so as to correspond to the high-load region $C_1$ in Step 3303, but also compares the number of revolutions Ne of the engine with a predetermined value Nf similarly set so as to correspond to the high-load region $C_1$ in Step 3304. Thus, the CPU, judging that the loads satisfying such conditions are not high loads, limits the optimal region in these processing steps, detects the intake manifold pressure when the EGR turns off from the on state thereafter, and makes a fault judgment based on such detected intake manifold pressure (Step 3305).

Thus, the fourth embodiment of the invention is characterized as limiting the optimal range of the intake manifold pressure at the time the EGR turns off from the on state to 50 to 60 mmHg in the case where the load conditions are such that e.g., the intake manifold pressure Pb is set to 300 to 500 mmHg and the number of revolutions Ne of the engine to 3000 to 4000 rpm. Accordingly, troubleshooting accuracy could be improved compared with the conventional technique.

Figure 21:
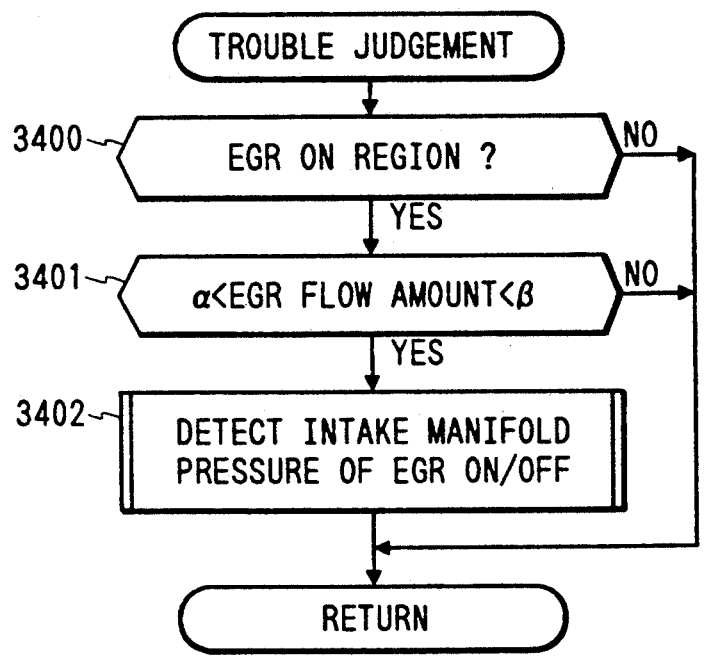
FIG. 21 is a flowchart illustrative of another mode of the fourth embodiment.

FIG. 21 illustrates another mode of the fourth embodiment. This embodiment is designed to troubleshoot the EGR controller in the large-EGR-flow-rate region by judging the EGR-on region, judging whether or not the EGR flow amount is equal to or smaller than a predetermined value, i.e., within a range defined by the upper and lower judgment values $\alpha$, $\beta$, and similarly detecting the intake manifold pressure when the EGR turns off from the on state only when the EGR flow amount is within such range (Steps 3400 to 3402).

While the case of making a fault judgment by the loads such as the intake manifold pressure and the number of revolutions of the engine has been described in the above embodiment, application of the invention is not limited thereto. The same advantage can be obtained using the amount of air sucked or the back pressure as loads.

As described above, the troubleshooting system according to the fourth embodiment of the invention is designed to limit the EGR troubleshooting region depending on the load. Therefore, faults can be found at a region which is within an EGR-on region and in which a detected value such as the difference in intake manifold pressure between the turning on and off of the EGR is large, thus contributing to improving troubleshooting accuracy.

According to another aspect of the invention, faults can be found only when the EGR flow amount becomes equal to or smaller than a predetermined value. Therefore, variations in torque at the time the EGR turns on and off are reduced, thereby preventing driveability from being deteriorated.

A fifth embodiment of the invention will be described with reference to the accompanying drawings.

Figure 22:
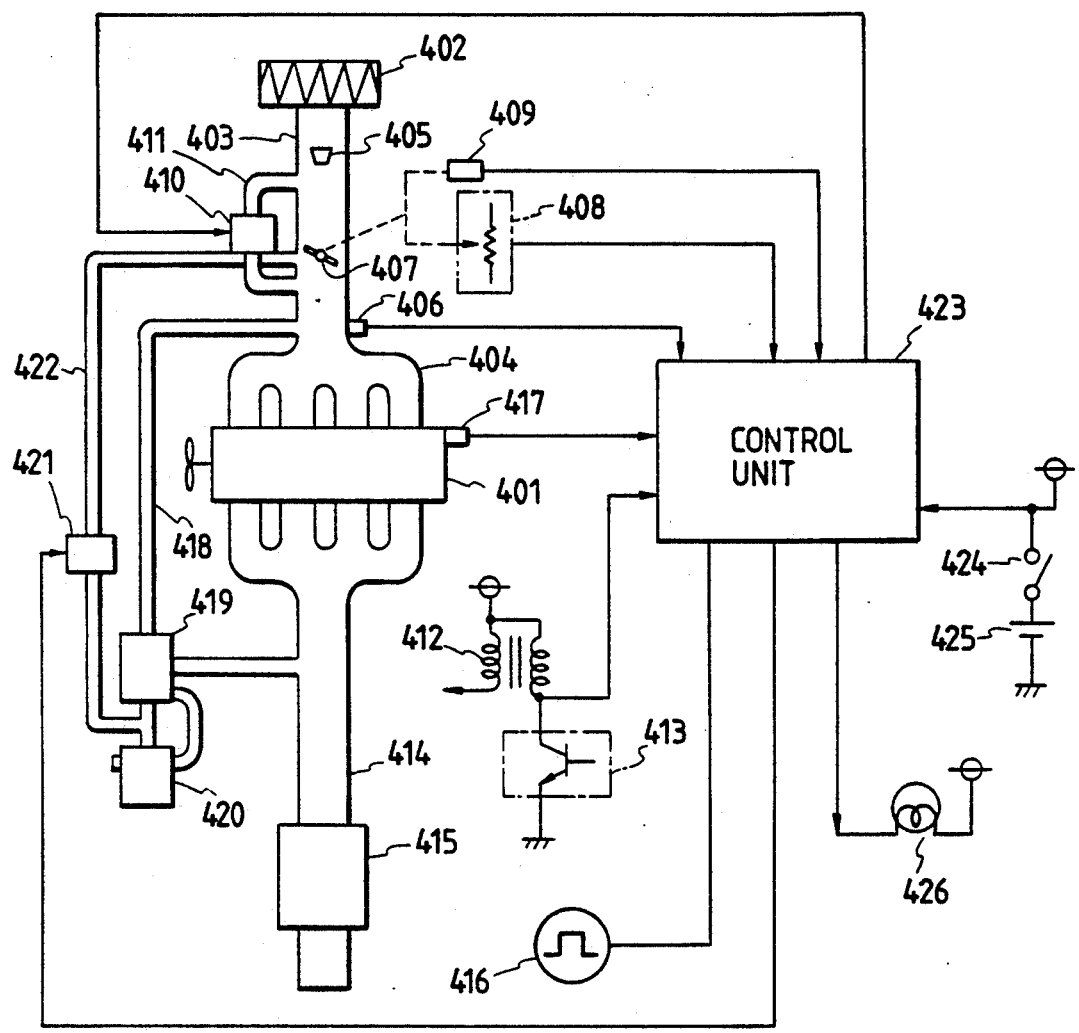
FIG. 22 is a block diagram showing an example in which a troubleshooting system, which is a fifth embodiment of the invention, is applied to the EGR controller.

FIG. 22 is a block diagram showing the fifth embodiment, in which the invention is applied to an EGR controller. This is a case of a back-pressure EGR controller using the BPT valve which is provided with an engine 401, an air cleaner 402, an intake pipe 403, an intake manifold 404, an injector for injecting fuel 405, a pressure sensor 406 serving as an operation condition detecting means for detecting a pressure of the intake manifold 404, a throttle valve 407, a throttle opening sensor 408 for detecting an opening of the throttle valve 407, an idle switch 409 for detecting an operation condition of the throttle valve 407, an idle speed control (ISC) solenoid 410 for controlling a number of revolutions of the engine 401, the solenoid, disposed along a bypass 411 that bypasses the throttle valve 407 arranged on the intake pipe 403, to adjust the amount of air to be supplied to the throttle valve, an ignition coil 412, an igniter 413, an exhaust pipe 414, a catalyzer 415, a car speed sensor 416 and a water temperature sensor 417 for detecting the temperature of cooling water for the engine 401.

A recirculation pipe 418 recirculates a part of exhaust gas in the exhaust pipe 414 to the intake pipe 403. An EGR valve 419 serves as a recirculation valve for controlling the flow rate of the exhaust gas flowing through the recirculation pipe 418. A BPT valve 420 controls the passage area of the EGR valve 419. An EGR solenoid 421 controls the control pressure to the BPT valve 420 so that the EGR flow amount can be controlled by the BPT valve 420. Further, an electronic control unit 423, an ignition key switch 424 (hereinafter referred to as "IG switch"), a battery 425 and a troubleshooting alarm lamp 426 are provided.

Here, the EGR solenoid 421 is connected to a control passage 422 between a diaphragm chamber of the EGR valve 419 and the intake pipe 403. The EGR solenoid 421 is operated on and off by a signal from the electronic control unit 423 to control the control pressure to the BPT valve 420, whereby the control pressure of the BPT valve 420 is adjusted to the atmospheric pressure when the EGR solenoid 421 is de-energized, thus stopping the EGR.

The electronic control unit 423 receives respective signals from the pressure sensor 406, the throttle opening sensor 408, the idle switch 409, and the like. The electronic control unit 423 not only stores a first intake manifold pressure detected by the pressure sensor 406 when the EGR valve 419 is set to a first state in which the passage area of the EGR valve 419 is wide, i.e., when EGR is turned on, but also stores a second intake manifold pressure detected by the pressure sensor 406 when the EGR valve 419 is set to a second state in which the passage area of the EGR valve 419 is narrow or zero, i.e., when the EGR is turned off, so that the electronic control unit 423 can make a fault judgment based on the detected first and second intake manifold pressures. And when the EGR valve 419 switches from the on state to the off state and further when the EGR valve 419 switches from the off state to the on state, the electronic control unit 423 supplies a predetermined amount of air by adjusting the amount of air to be supplied to the engine 401 in accordance with an intake manifold pressure detected by the pressure sensor 406 and driving the ISC solenoid 410 that controls the number of revolutions of the engine.

Figure 23:
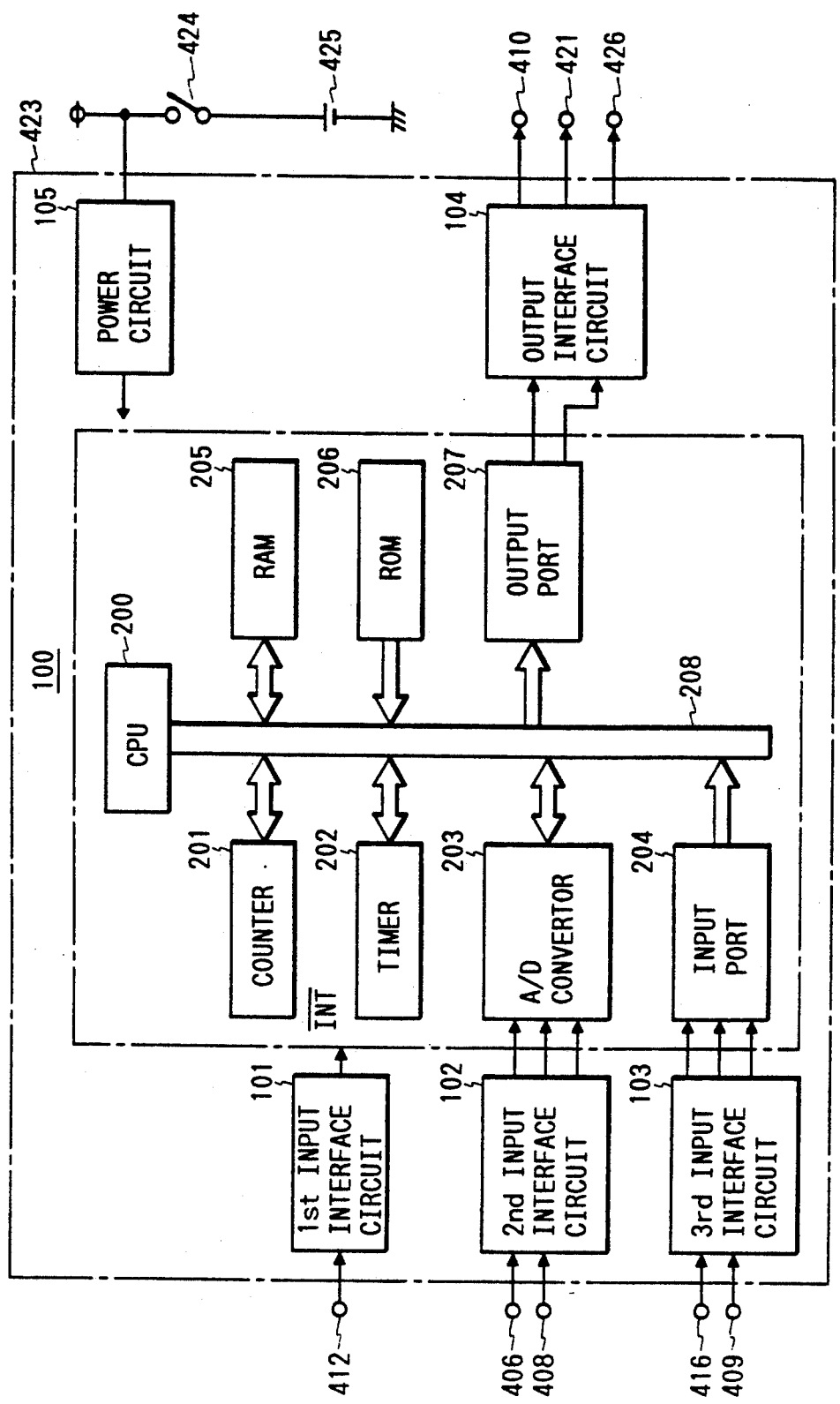
FIG. 23 is a detailed block diagram showing an electronic control unit shown in FIG. 22.

FIG. 23 is a detailed block diagram of the electronic control unit 423, in which elements similar to those shown in FIG. 2 are designated by the same reference numerals. In FIG. 23, a first input interface circuit 101 receives signals of, e.g., the ignition coil 412. A second input interface circuit 102 receives signals from the pressure sensor 406, the throttle opening sensor 408, and the like and applies output signals to an A/D converter 203. A third input interface circuit 103 receives signals of, e.g., the idle switch 409 and the car speed sensor 416. An output interface circuit 104 amplifies a drive output from the output port 207 and applies the amplified output to the ISC solenoid 410 and the EGR solenoid 421. A power supply circuit 105 is supplied power of the battery 425 through the IG switch 424. The power output from the power supply circuit 105 is used to drive the control unit 423 including the microcomputer 100.

An operation of the fifth embodiment will be described with reference to the EGR troubleshooting flowchart shown in FIG. 26.

Figure 26:
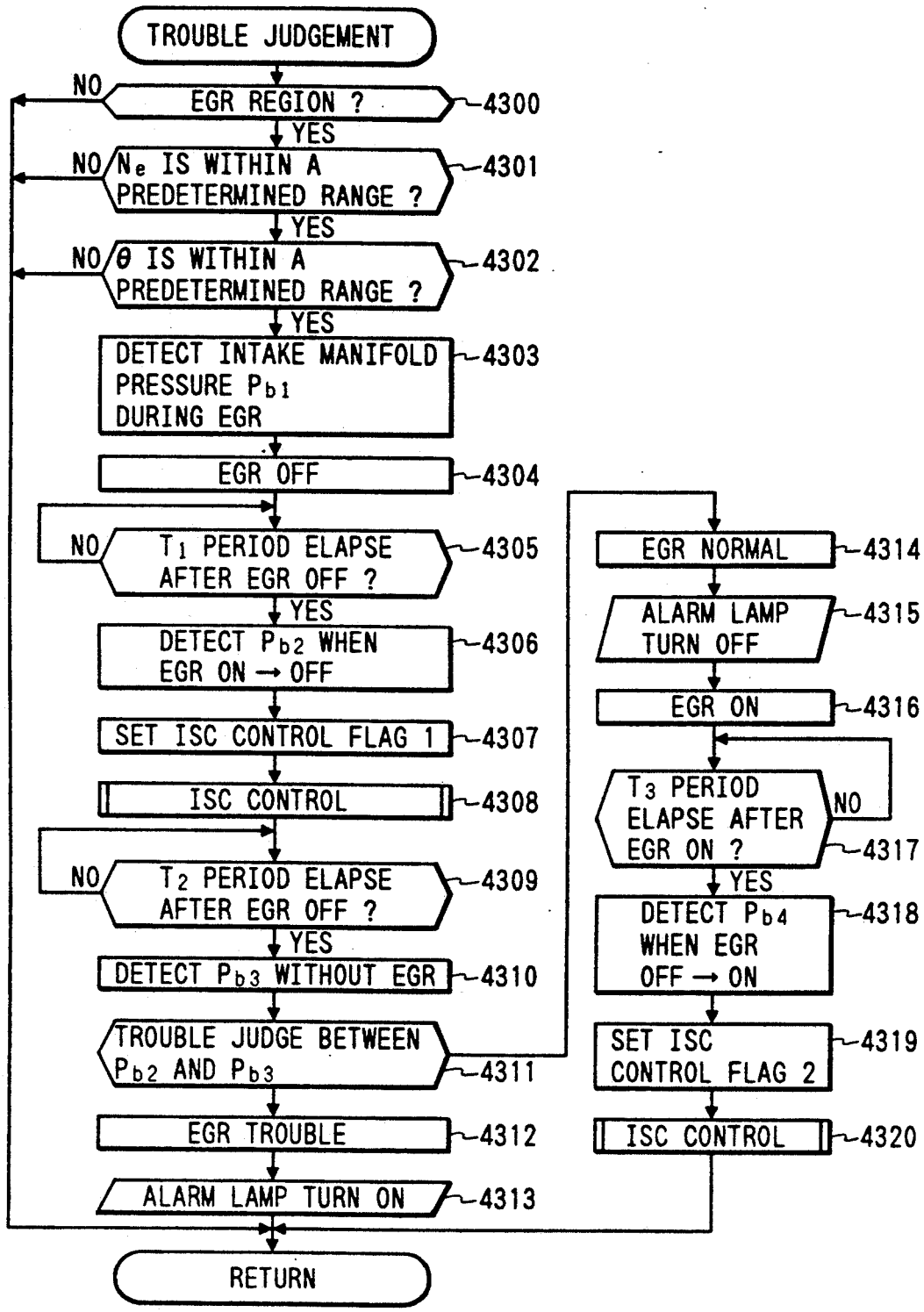
FIG. 26 is a flowchart showing exemplary EGR troubleshooting processing of the fifth embodiment.

In FIG. 26, the CPU 200 judges, upon start of the engine 401, whether or not the EGR is in an on region in Step 4300, and if the EGR is in the on region, the CPU judges whether or not the number of revolutions of the engine Ne is within a predetermined range in Step 4301. If the value Ne is within the predetermined range, then the CPU judges whether or not the throttle opening of the throttle valve 407 is within a predetermined range in Step 4302. If the throttle opening is within the predetermined range, the CPU advances to a next Step 4303. After judging that the engine 401 is in stable operation conditions through the above processing steps, the CPU detects an intake manifold pressure Pb1 detected by the pressure sensor 406 when the EGR is in the on state in Step 4303 (see FIG. 24(a), FIG. 24(b)), turns off the EGR in Step 4304 thereafter, and advances to a next Step 4305.

In Step 4305 the CPU 200 judges whether or not a predetermined time $T_1$ has elapsed after the EGR has turned off. If the predetermined time $T_1$ has elapsed, the CPU advances to a next Step 4306 to detect an intake manifold pressure $Pb_2$ (see FIG. 24(a) and FIG. 24(b)) when the EGR is turned off. And in Step 4307 the CPU sets an ISC flag 1 associated with the turning off of the EGR, and then effects the ISC in accordance with the flow shown in FIG. 27 (Step 4308).

Figure 27:
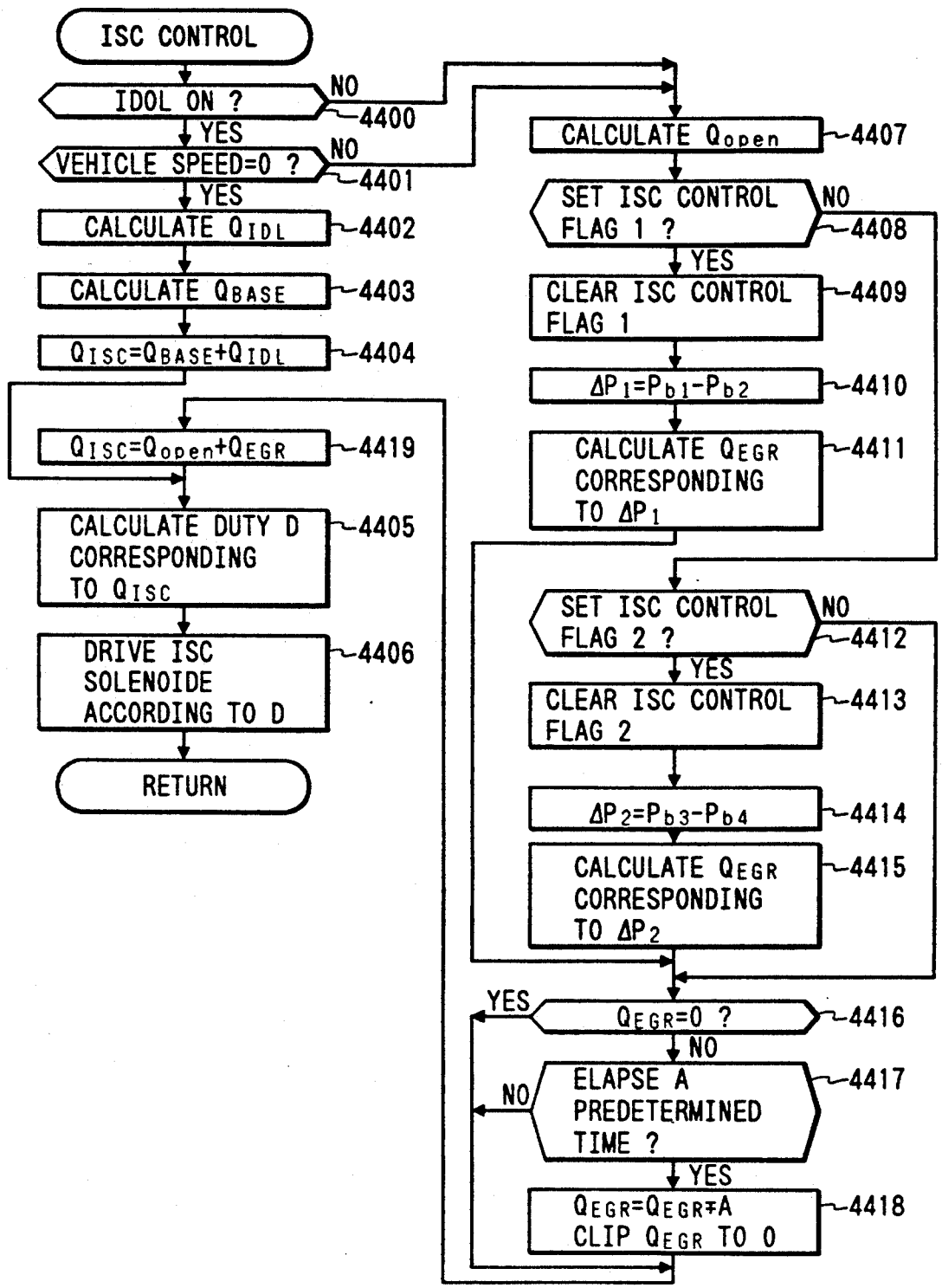
FIG. 27 is a flowchart showing exemplary idle speed control (ISC) judgment processing of the fifth embodiment.
Figure 29:
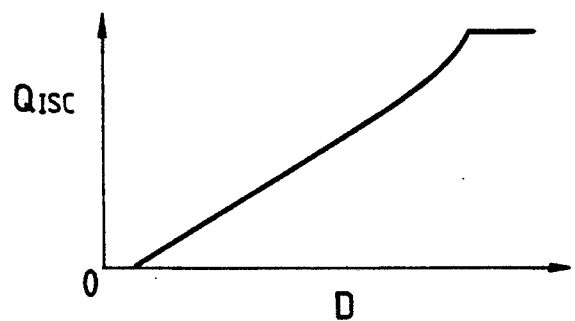
FIG. 29 is a diagram showing a relationship between an ISC air amount and a control duty to illustrate the fifth embodiment.
Figure 30:
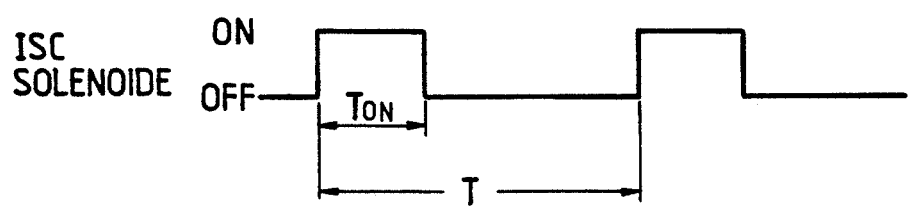
FIG. 30 is a diagram illustrative of a definition of the control duty.

That is, in FIG. 27 the CPU 200 judges whether or not the idle switch 409 is in the on state. If the idle switch is in the on state, the CPU judges whether or not there is a car speed in a next Step 4401. If there is no car speed, the CPU, judging that the car is in the idle state, advances to next Steps 4402, 4403. Accordingly, the CPU calculates not only a control value (target) $Q_{IDL}$ when the car is in the idle condition, but also a basic load quantity $Q_{BASE}$. The CPU then finds an ISC air amount $Q_{ISC}$ by adding the control value $Q_{IDL}$ to the basic load quantity $Q_{BASE}$ in Step 4404. The CPU further calculates a control duty D corresponding to the ISC air amount $Q_{ISC}$ based on a graph shown in FIG. 29 in Step 4405, and effects a normal idle revolution control so that the number of revolutions of the engine 401 can become equal to the targeted number of revolutions while driving the ISC solenoid 410 by a signal carrying such control duty D (Step 4406). FIG. 30 is a diagram illustrative of the definition of the control duty D. Assuming that $T_{ON}$ is the on time and that T is the single cycle, the control duty D is expressed by the following equation.

$$D = T_{ON}/T \times 100\% \tag{1}$$

Figure 28:
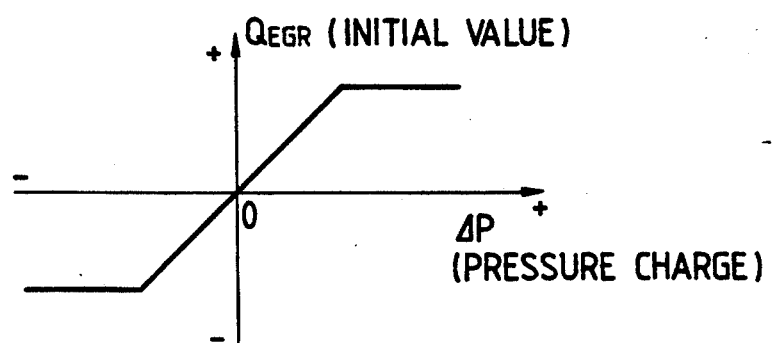
FIG. 28 is a diagram showing a relationship between a change in intake manifold pressure and an ISC air amount correcting initial value to illustrate the fifth embodiment.

On the other hand, if the car is judged not to be in the idle state in Steps 4400, 4401, the CPU 200 calculates a correcting value $Q_{Open}$ corresponding to the operation condition in Step 4407. The CPU further judges whether or not the ISC flag 1 has been set in Step 4408 and clears the flag 1 if set (Step 4409). And the CPU calculates a difference in intake manifold pressure $\nabla P_1 = Pb_1 - Pb_2$ when the EGR has been turned off in Step 4410 and then calculates an ISC air amount correcting initial value $Q_{EGR}$ in accordance with the increment in pressure $\nabla P$ based on a graph shown in FIG. 28.

The CPU 200 then judges whether or not the initial value $Q_{EGR}$ is set to zero in Step 4416. If the initial value is set to zero, the CPU advances to Step 4419 to obtain the ISC air amount $Q_{ISC}$ by adding the correcting value $Q_{Open}$ to the initial value $Q_{EGR}$. If the initial value $Q_{EGR}$ is not set to zero in Step 4416, the CPU judges whether or not a predetermined time (e.g., 100 msec) has elapsed in Step 4417, and clips the initial value $Q_{EGR}$ to zero by such a logic operation as $Q_{EGR} = Q_{EGR} \pm A$ (A is a constant) upon the elapse of such predetermined time (Step 4418). The CPU then advances to Step 4419 to calculate the ISC air amount $Q_{ISC}$ and supplies thereafter a predetermined amount of air to the engine 401 by driving the ISC solenoid 410.

Thus, the fifth embodiment is characterized as supplying a predetermined ISC air amount $Q_{ISC}$ to the engine 401 by the ISC solenoid in accordance with the difference in intake manifold pressure $\nabla P_1$ ($= Pb_1 - Pb_2$) when the EGR has been turned off from the on state (see FIG. 24 (d)), so that variations in torque due to an abrupt change in the EGR flow amount can be suppressed by the air supply from the ISC adjusting system as shown in FIG. 24 (e).

On the other hand, after the EGR has been turned off, the CPU 200 judges whether or not a time $T_2$ that is preset for troubleshooting as a region in which the engine is in stable conditions in Step 4309 shown in FIG. 26. The CPU then detects an intake manifold pressure $Pb_3$ when the EGR turns on in Step 4310 upon elapse of such time $T_2$ (see FIG. 24(a) and FIG. 24(b)) and advances to Step 4311. Accordingly, the CPU troubleshoots the EGR controller based on the intake manifold pressure $Pb_1$ when the EGR is turned on and the intake manifold pressure $Pb_3$ when the EGR is turned off in Step 4311. If these values are outside predetermined ranges, the CPU, judging that the EGR controller is abnormal, not only sets a flag to that effect, but also turns on the alarm lamp 426 (Steps 4312, 4313). If these values are within the predetermined ranges, the CPU, judging that the EGR controller is normal, not only sets the flag to that effect, but also turns off the alarm lamp 426 (Step 4315).

Then, after turning the EGR on in Step 4316, the CPU 200 judges whether or not a time $T_3$ has elapsed after the EGR has been turned on in a next step 4317. If the predetermined time $T_3$ has elapsed, the CPU advances to a next Step 4318 to detect an intake manifold pressure $Pb_4$ when the EGR turns on from the off state (see FIG. 24(a) and FIG. 24(b)). Accordingly, the CPU sets an ISC control flag 2 associated with the switching of the EGR from the off state to the on state in Step 4319 and effects the ISC control in accordance with the flow shown in FIG. 27 in a next Step 4320.

That is, in FIG. 27 the CPU 200 calculates the correcting value $Q_{Open}$ corresponding to the operation condition in Step 4407 if the car is not in the idle state in Steps 4400, 4401. And if the ISC flag 1 is not set in Step 4408, the CPU judges whether or not the ISC flag 2 is set in a next Step 4412. If the ISC flag 2 is set, the CPU clears the flag 2 (Step 4413). The CPU then calculates a difference in intake manifold pressure $\nabla P_2 = Pb_3 - Pb_4$ when the EGR has been turned on from the off state in Step 4414, and calculates the initial value $Q_{EGR}$ corresponding to the increment in pressure $\nabla P_2$ in a next Step 4415.

Then, the CPU 200 similarly judges whether or not the initial value $Q_{EGR}$ is zero. If the initial value $Q_{EGR}$ is zero, the CPU advances to a next Step 4419 to calculate the ISC air amount $Q_{ISC}$ by adding the correcting value $Q_{Open}$ to the initial value $Q_{EGR}$ and supplies a predetermined amount of air to the engine 401 by driving the ISC solenoid 410 based on the calculated ISC air amount $Q_{ISC}$. Accordingly, in this embodiment a predetermined ISC air amount $Q_{ISC}$ is supplied to the engine 401 by the ISC solenoid 410 in accordance with the difference in intake manifold pressure $\nabla P_2$ ($= Pb_3 - Pb_4$) when the EGR has been turned on from the off state (see FIG. 24 (d)). Therefore, variations in torque due to an abrupt change in EGR flow amount can be suppressed by adjusting the air supply from the ISC adjusting system.

As described above, the troubleshooting system according to the fifth embodiment of the invention is designed to supply the air by the operation of the ISC solenoid which corresponds to a change in the values detected by the EGR on/off operation condition detecting means in order to detect faults of the EGR controller based on the turning on and off of the EGR. Therefore, variations in torque at the time of an abrupt change in EGR flow amount can be reduced, which contributes to providing the operator with a shock-free environment.

What is claimed is:

1. A troubleshooting system for an exhaust gas recirculation controller comprising:
   a recirculation pipe for recirculating exhaust gas in an internal combustion engine to an intake pipe;
   a recirculation valve for controlling a flow amount of said exhaust gas flowing through said recirculation pipe;
   recirculation valve passage area control means for controlling a passage area of said recirculation valve;
   operation condition detecting means for detecting at least one operation condition of said internal combustion engine;
   means for storing operation condition values detected by said operation condition detecting means during a first predetermined time interval when the recirculation valve is closed and immediately after it is opened by said recirculation valve passage area control means; and
   judging means for making a fault judgment based on said detected operation condition values, and wherein
   said operation condition detecting means includes an operation condition detecting element for sampling and outputting detected values of said operation condition during said first predetermined time interval beginning when said recirculation valve is temporarily switched from an open condition to a closed condition, such that said recirculation valve is closed for a second predetermined time interval, and wherein said judging means includes means for calculating a rate of change between said detected values and determines whether a fault exists based upon a comparison of a calculated value with a predetermined value.

2. A troubleshooting system according to claim 1, further comprising an alarm means for issuing an alarm when said calculated value is determined to be out of a predetermined range.

3. A troubleshooting system according to claim 2, wherein said operation condition detecting element detects a pressure in said intake pipe as said detected value.

4. A troubleshooting system according to claim 1, wherein said operation condition detecting means further includes a second operation condition detecting element so that the pressure at two predetermined points in said recirculation pipe from an outlet of said recirculation valve to said intake pipe are detected, in which said second operation condition detecting element detects pressure during said first predetermined time interval beginning when said passage area of said recirculation valve is temporarily switched from said open condition to said closed condition by said recirculation valve passage area control means, and wherein said judging means includes means for calculating differences in pressure at said two predetermined points, and determines whether said differences in pressure are within a predetermined range.

5. A troubleshooting system according to claim 1, wherein said operation condition detecting means further includes a second operation condition detecting element so that the pressure at two predetermined points in said recirculation pipe from an outlet of said recirculation valve to said intake pipe are detected in which said second operation condition detecting element detects pressure during said first predetermined time interval beginning when said passage area of said recirculation valve is temporarily switched from said open condition to said closed condition by said recirculation valve passage area control means, and wherein said judging means includes a means for calculating at time delay experienced before said pressures at said two predetermined points reach the same value, and determines whether said time delay is within a predetermined range.

6. A troubleshooting system according to claim 1, wherein said operation condition detecting means outputs a detected value of a first operation condition of the engine in which said passage area of said recirculation valve is set to said open condition by said recirculation valve passage area control means, and also outputs a detected value of a second operation condition of the engine in which said passage area of said recirculation valve is set to said closed condition by said recirculation valve passage area control means, and wherein said second predetermined time interval during which said passage area of said recirculation valve is set to said closed condition is varied in accordance with a state of a predetermined number of initial operating conditions.

7. A troubleshooting system according to claim 1, wherein said operation condition detecting means outputs a detected value of a first operation condition of the engine in which said passage area of said recirculation valve is set to said open condition by said recirculation valve passage area control means, and also outputs a detected value of a second operation condition of the engine in which said passage area of said recirculation valve is set to said closed condition by said recirculation valve passage area control means, and wherein said judging means performs a fault judgment within a predetermined region excluding a high-load region and a low-load region, said high-load region being a region in which values detected by said operation condition detecting means have a large recirculation loss, and said low-load region being a region in which said flow amount of said exhaust gas flowing through said recirculation pipe is small.

8. A troubleshooting system according to claim 7, wherein said judging means performs a fault judgment when said flow amount of said exhaust gas flowing through said recirculation pipe is no greater than a predetermined value.

9. A troubleshooting system according to claim 1, wherein said operation condition detecting means further includes a second operation condition detecting element so that the pressure at two predetermined points in said recirculation pipe from an inlet of said recirculation valve to said exhaust pipe are detected, in which said second operation detecting element detects pressure during said first predetermined time interval beginning when said passage area of said recirculation valve is temporarily switched from said open condition to said closed condition by said recirculation valve passage area control means, and wherein said judging means includes means for calculating differences in pressure at said two predetermined points, and determines whether said differences in pressure are within a predetermined range.

10. A troubleshooting system according to claim 1, wherein said operation condition detecting means further includes a second operation condition detecting element so that the pressure at two predetermined points in said recirculation pipe from an inlet of said recirculation valve to said exhaust pipe are detected, in which said second operation condition detecting element detects pressure during said first predetermined time interval beginning when said passage area of said recirculation valve is temporarily switched from said open condition to said closed condition by said recirculation valve passage area control means, and wherein said judging means includes a means for calculating a time delay experienced before said pressures at said two predetermined points reach the same value, and determines whether said time delay is within a predetermined range.

11. A troubleshooting system according to claim 1, wherein said detected values detected by said operation condition detecting element are output at predetermined time intervals, and wherein said calculating means calculates a maximum rate of change between said detected values and determines whether any fault exists based upon comparison of said maximum value of the rate of change with said predetermined value.

12. A troubleshooting system for an exhaust gas recirculation controller comprising:
a recirculation pipe for recirculating exhaust gas in an internal combustion engine to an intake pipe;
a recirculation valve for controlling a flow amount of said exhaust gas flowing through said recirculation pipe;
recirculation valve passage area control means for controlling a passage area of said recirculation valve;
operation condition detecting means for detecting at least one operation condition of said internal combustion engine;
means for storing values detected by said operation condition detecting means corresponding to the passage area of said recirculation valve as controlled by said recirculation valve passage area control means; and
judging means for making a fault judgment based on said detected values, and wherein
said operation condition detecting means outputs a detected value of a first condition in which said passage area of said recirculation value passage area control means, and outputs a detected value of a second condition in which said passage area of said recirculation valve is set to a closed condition by said recirculation valve passage area control means, and wherein a revolution adjusting means is provided for supplying a predetermined amount of air to said internal combustion engine and for controlling a number of revolutions of said internal combustion engine in accordance with values detected from said operation condition detecting means.

* * * * *